(12) United States Patent
Long

(10) Patent No.: US 10,132,420 B2
(45) Date of Patent: Nov. 20, 2018

(54) ELECTRIC-ACTUATED CHOKE APPARATUS AND METHODS

(71) Applicant: SEABOARD INTERNATIONAL INC., Houston, TX (US)

(72) Inventor: Timothy Long, Oklahoma City, OK (US)

(73) Assignee: SEABOARD INTERNATIONAL INC., Houston, TX (US)

( * ) Notice: Subject to any disclaimer, the term of this patent is extended or adjusted under 35 U.S.C. 154(b) by 0 days.

(21) Appl. No.: 15/176,859

(22) Filed: Jun. 8, 2016

(65) Prior Publication Data

US 2016/0369912 A1 Dec. 22, 2016

Related U.S. Application Data

(60) Provisional application No. 62/316,724, filed on Apr. 1, 2016, provisional application No. 62/180,735, filed on Jun. 17, 2015.

(51) Int. Cl.

| | |
|---|---|
| *F16K 31/05* | (2006.01) |
| *F16K 31/50* | (2006.01) |
| *E21B 34/02* | (2006.01) |
| *F16K 31/04* | (2006.01) |
| *E21B 21/08* | (2006.01) |

(Continued)

(52) U.S. Cl.
CPC ............ *F16K 31/047* (2013.01); *E21B 21/08* (2013.01); *E21B 21/106* (2013.01); *F16K 31/05* (2013.01); *F16K 31/508* (2013.01); *F16K 37/0016* (2013.01); *F16K 37/0041* (2013.01)

(58) Field of Classification Search
CPC ...... F16K 31/047; F16K 31/048; F16K 31/05; F16K 31/508; E21B 21/106; E21B 34/02; E21B 34/066; E21B 43/12
USPC ................................ 251/122, 129.11, 129.12
See application file for complete search history.

(56) References Cited

U.S. PATENT DOCUMENTS

| | | | |
|---|---|---|---|
| 2,930,571 A * | 3/1960 | Vogl ...................... | F16K 31/047 251/129.12 |
| 3,049,140 A | 8/1962 | Thornhill et al. | |
| 4,461,450 A | 7/1984 | Soland et al. | |

(Continued)

OTHER PUBLICATIONS

International Search Report issued re International Application No. PCT/US2016/36415 by ISA/US dated Aug. 29, 2016. (2 pages).

(Continued)

*Primary Examiner* — Seth W Mackay-Smith
(74) *Attorney, Agent, or Firm* — Haynes and Boone LLP

(57) ABSTRACT

In one aspect, a choke apparatus includes a choke body through which fluid is adapted to flow, a bonnet assembly connected to the choke body, and an electric actuator operably coupled to the bonnet assembly. The choke apparatus operates to control the imposition of backpressure on the fluid. In one embodiment, an actuator stem of the electric actuator is toollessly operably coupled to a choke stem of the bonnet assembly. In another embodiment, an adapter is connected to the bonnet assembly. In yet another embodiment, an absolute position sensor is disposed within a housing of the electric actuator. In still yet another embodiment, a measurement scale is used to indicate choke position. In certain embodiments, the choke apparatus provides for manual override. A method of assembling a choke apparatus is provided. A method of retrofitting a choke apparatus is provided.

14 Claims, 31 Drawing Sheets

(51) Int. Cl.
*E21B 21/10* (2006.01)
*F16K 37/00* (2006.01)

(56) References Cited

U.S. PATENT DOCUMENTS

| | | | | |
|---|---|---|---|---|
| 4,518,148 A * | 5/1985 | Renfro | ............... | E21B 34/02 137/312 |
| 4,558,842 A * | 12/1985 | Peil | ............... | E21B 33/062 251/1.3 |
| 4,617,992 A | 10/1986 | Abel | | |
| 5,195,721 A * | 3/1993 | Akkerman | ............... | F16D 27/105 192/56.1 |
| 5,295,907 A * | 3/1994 | Akkerman | ............... | F16D 27/105 192/56.33 |
| 5,518,462 A * | 5/1996 | Yach | ............... | F16H 37/041 251/129.11 |
| 5,832,779 A * | 11/1998 | Madrid | ............... | F16H 25/20 137/72 |
| 6,488,260 B1 * | 12/2002 | Dietz | ............... | F16K 31/047 251/129.13 |
| 9,163,484 B2 * | 10/2015 | Biester | ............... | E21B 33/0355 |
| 9,297,458 B1 * | 3/2016 | Corte, Jr. | ............... | F16K 1/32 |
| 2003/0145667 A1 * | 8/2003 | Donald | ............... | F16K 31/047 74/89.26 |
| 2004/0041113 A1 * | 3/2004 | Biester | ............... | F16K 31/04 251/129.11 |
| 2004/0134665 A1 * | 7/2004 | Greeb | ............... | E21B 34/02 166/379 |
| 2004/0216888 A1 * | 11/2004 | Schmidt | ............... | F16K 31/05 166/377 |
| 2011/0115319 A1 * | 5/2011 | Schade | ............... | F16K 31/047 310/83 |
| 2012/0256111 A1 * | 10/2012 | Hoang | ............... | F16K 3/18 251/264 |
| 2014/0041861 A1 * | 2/2014 | Nicholson | ............... | E21B 34/02 166/250.01 |
| 2014/0090888 A1 * | 4/2014 | Smith | ............... | E21B 21/106 175/38 |
| 2014/0262333 A1 * | 9/2014 | Frenzel | ............... | E21B 43/12 166/378 |
| 2015/0345251 A1 * | 12/2015 | Nicholson | ............... | E21B 34/02 166/91.1 |

OTHER PUBLICATIONS

Written Opinion issued re International Application No. PCT/US2016/36415 by ISA/US dated Aug. 29, 2016. (14 pages).

* cited by examiner

ELECTRIC-ACTUATED CHOKE APPARATUS AND METHODS

CROSS-REFERENCE TO RELATED APPLICATIONS

This application claims the benefit of the filing date of, and priority to, U.S. Application No. 62/180,735, filed Jun. 17, 2015, the entire disclosure of which is hereby incorporated herein by reference.

This application also claims the benefit of the filing date of, and priority to, U.S. Application No. 62/316,724, filed Apr. 1, 2016, the entire disclosure of which is hereby incorporated herein by reference.

TECHNICAL FIELD

This disclosure relates in general to a choke apparatus such as a drilling choke and, in particular, to an electric-actuated drilling choke used in, for example, oil and gas exploration and production operations.

BACKGROUND OF THE DISCLOSURE

A backpressure control device, or choke, is sometimes used to impose backpressure on fluid in different applications. For example, during the drilling of an oil or gas well, a backpressure control device or choke, which is sometimes referred to as a drilling choke, is used to impose backpressure on drilling fluid. In some cases, the operation of the drilling choke is affected by high or low temperatures. Further, the drilling choke may take too long to respond to pressure fluctuations within the system through which the drilling fluid is being circulated; the drilling choke may not accurately and precisely control the imposition of backpressure on the drilling fluid. Additionally, if the drilling choke is not assembled properly, the performance of the drilling choke may be compromised. Also, the drilling choke may not be able to be retrofitted to improve its reliability, its response time, and the degree to which the drilling choke accurately and precisely controls the imposition of backpressure. Moreover, if the operation of the drilling choke is stopped, restarting the operation thereof may require recalibration of the drilling choke. In some cases, a visual inspection of the drilling may not indicate the actual position of the drilling choke, that is, the degree to which the drilling choke is open or closed. Also, if the operation of the drilling choke is controlled using a control system that employs an actuator, the drilling choke may not have an adequate manual override. Therefore, what is needed is an apparatus or method that addresses one or more of the foregoing issues, and/or one or more other issues.

SUMMARY

In a first aspect, there is provided a choke apparatus that includes a choke body through which fluid is adapted to flow, the choke body defining a longitudinal axis. A bonnet assembly is connected to the choke body, the bonnet assembly including a choke stem. An electric actuator is operably coupled to the bonnet assembly, the electric actuator including an actuator stem toollessly operably coupled to the choke stem of the bonnet assembly. The actuator stem and the choke stem are generally coaxial along the longitudinal axis of the choke body. The actuator stem and the choke stem are movable, relative to the choke body, to control imposition of backpressure on the fluid when the fluid flows through the choke body.

In an exemplary embodiment, the choke stem includes a cap, and the actuator stem includes a first opening that receives the cap to toollessly operably couple the actuator stem to the choke stem.

In another exemplary embodiment, the actuator stem further includes a second opening intersecting the first opening, the second opening defining an inside surface; and a cavity formed in the inside surface, the cavity defining a first axially-facing surface; wherein a second axially-facing surface, which is spaced in a parallel relation from the first axially-facing surface, is at least partially defined by the cavity; and wherein at least a portion of the cap is disposed within the cavity so that the portion of the cap is disposed between the first and second axially-facing inside surfaces to toollessly operably couple the actuator stem to the choke stem.

In yet another exemplary embodiment, the first opening of the actuator stem is not generally coaxial with the longitudinal axis of the choke body; and the second opening of the actuator stem is generally coaxial with the longitudinal axis of the choke body.

In certain exemplary embodiments, the choke apparatus further includes an adapter connected to the electric actuator; wherein the bonnet assembly includes: a bonnet plate through which the choke stem extends, and to which the adapter is connected; a nose protruding from the bonnet plate and connected to the choke body to connect the bonnet assembly to the choke body, the nose defining a distal end surface; a bore formed in the distal end surface of the of the nose; and a gate extending within the bore and to which the choke stem is connected.

In an exemplary embodiment, the adapter includes an opening through which the actuator stem extends, and the bonnet plate of the bonnet assembly includes a recess sized to receive the actuator stem so that the actuator stem is permitted to move relative to the bonnet plate.

In another exemplary embodiment, the choke body includes an internal threaded connection; wherein the nose includes an external threaded connection threadably engaged with the internal threaded connection of the choke body to connect the bonnet assembly to the choke body; wherein the bonnet assembly further includes a plurality of slotted openings formed through the bonnet plate; wherein the slotted openings are circumferentially spaced and each of the slotted openings is curved; wherein the choke apparatus further includes fasteners extending through the slotted openings, respectively, to connect the bonnet assembly to the adapter; and wherein the slotted openings allow the adapter and the electric actuator to rotate, relative to the bonnet assembly, to reduce risk of disengagement, at least in part, of the external threaded connection of the nose from the internal threaded connection of the choke body.

In yet another exemplary embodiment, the bonnet assembly further includes a plurality of circumferentially-spaced, curved external alignment shoulders formed in the bonnet plate; wherein the adapter includes a plurality of circumferentially-spaced, curved internal alignment shoulders formed therein; and wherein the external alignment shoulders mate against the internal alignment shoulders, respectively, to align the bonnet plate with the adapter.

In a second aspect, there is provided a choke apparatus that includes a choke body through which fluid is adapted to flow, the choke body including a seat; a bonnet assembly connected to the choke body, the bonnet assembly including a gate adapted to move, relative to the seat, to control imposition of backpressure on the fluid when the fluid flows through the choke body; an adapter connected to the bonnet assembly; and an electric actuator connected to the adapter and operably coupled to the bonnet assembly so that the electric actuator is adapted to cause the gate to move, relative to the seat, to control the imposition of backpressure on the fluid when the fluid flows through the choke body.

In an exemplary embodiment, the connection between the adapter and the bonnet assembly permits the electric actuator to move, relative to each of the bonnet assembly and the choke body.

In another exemplary embodiment, the bonnet assembly further includes a bonnet plate to which the adapter is connected; a nose protruding from the bonnet plate and connected to the choke body to connect the bonnet assembly to the choke body, the nose defining a distal end surface; and a bore formed in the distal end surface of the nose, wherein the gate extends within the bore.

In yet another exemplary embodiment, the bonnet assembly further includes a plurality of circumferentially-spaced, curved external alignment shoulders formed in the bonnet plate; wherein the adapter includes a plurality of circumferentially-spaced, curved internal alignment shoulders formed therein; and wherein the external alignment shoulders mate against the internal alignment shoulders, respectively, to align the bonnet plate with the adapter.

In certain exemplary embodiments, the choke body includes an internal threaded connection; wherein the nose includes an external threaded connection threadably engaged with the internal threaded connection of the choke body to connect the bonnet assembly to the choke body; wherein the bonnet assembly further includes a plurality of slotted openings formed through the bonnet plate; wherein the slotted openings are circumferentially spaced and each of the slotted openings is curved; wherein the choke apparatus further includes fasteners extending through the slotted openings, respectively, to connect the bonnet assembly to the adapter; and wherein the slotted openings allow the adapter and the electric actuator to rotate, relative to the bonnet assembly and the choke body, to reduce risk of disengagement, at least in part, of the external threaded connection of the nose from the internal threaded connection of the choke body.

In an exemplary embodiment, the choke body defines a longitudinal axis; wherein the bonnet assembly further includes a choke stem connected to the gate; wherein the electric actuator includes an actuator stem coupled to the choke stem; wherein the actuator stem and the choke stem are generally coaxial along the longitudinal axis of the choke body; and wherein the electric actuator is adapted to cause the actuator stem to move so that the choke stem and the gate connected thereto move, relative to the seat, to control the imposition of backpressure on the fluid when the fluid flows through the choke body.

In another exemplary embodiment, the adapter includes an opening through which the actuator stem extends, and the bonnet plate of the bonnet assembly includes a recess sized to receive the actuator stem so that the actuator stem is permitted to move relative to the bonnet plate.

In yet another exemplary embodiment, the choke stem includes a cap, and the actuator stem includes a first opening that receives the cap.

In certain exemplary embodiments, the actuator stem further includes a second opening intersecting the first opening, the second opening defining an inside surface; and a cavity formed in the inside surface, the cavity defining a first axially-facing surface; wherein a second axially-facing surface, which is spaced in a parallel relation from the first axially-facing surface, is at least partially defined by the cavity; and wherein at least a portion of the cap is disposed within the cavity so that the portion of the cap is disposed between the first and second axially-facing inside surfaces.

In an exemplary embodiment, the first opening of the actuator stem is not generally coaxial with the longitudinal axis of the choke body, and the second opening of the actuator stem is generally coaxial with the longitudinal axis of the choke body.

In a third aspect, there is provided a choke apparatus that includes a choke body through which fluid is adapted to flow, the choke body including a seat; a bonnet assembly connected to the choke body, the bonnet assembly including a gate adapted to move, relative to the seat, to control imposition of backpressure on the fluid when the fluid flows through the choke body; an electric actuator operably coupled to the bonnet assembly so that the electric actuator is adapted to cause the gate to move, relative to the seat, to control the imposition of backpressure on the fluid when the fluid flows through the choke body, wherein the electric actuator includes: a housing; and a translation component disposed within the housing, operably coupled to the gate, and adapted to move within, and relative to, the housing to cause the gate to move, relative to the seat, to control the imposition of backpressure on the fluid when the fluid flows through the choke body; and an absolute position sensor disposed within the housing and operably coupled to the translation component, wherein the absolute position sensor is adapted to detect the location of the translation component within the housing and thus indirectly detect the position of the gate.

In an exemplary embodiment, the electric actuator is adapted to be energized and is adapted to operate to cause the gate to move when so energized, but is not adapted to cause the gate to move when de-energized; wherein, after the electric actuator has been de-energized and re-energized, the absolute position sensor allows the choke apparatus to resume operation without recalibration.

In another exemplary embodiment, the translation component includes a nut to which the absolute position sensor is operably coupled; wherein the electric actuator further includes a linear roller screw extending through the nut and adapted to rotate within the housing; and wherein, when the linear roller screw rotates within the housing, the nut moves within the housing and causes the gate to move, relative to the seat, to control the imposition of backpressure on the fluid when the fluid flows through the choke body.

In yet another exemplary embodiment, the absolute position sensor includes a linear transducer.

In certain exemplary embodiments, the choke apparatus further includes at least one controller in communication with the absolute position sensor and to which the absolute position sensor transmits output related to the position of the gate.

In an exemplary embodiment, the output includes one or more electrical current signals.

In another exemplary embodiment, the at least one controller controls the movement of the gate based on the output transmitted from the absolute position sensor.

In a fourth aspect, there is provided a choke apparatus having a choke position that is variable, the choke apparatus including a choke body through which fluid is adapted to flow, the choke body including a seat; a bonnet assembly connected to the choke body, the bonnet assembly including a gate adapted to move, relative to the seat, to control imposition of backpressure on the fluid when the fluid flows through the choke body, wherein the choke position is based on the position of the gate relative to the seat; an electric actuator operably coupled to the bonnet assembly so that the electric actuator is adapted to cause the gate to move, relative to the seat, to control the imposition of backpressure on the fluid when the fluid flows through the choke body, wherein the electric actuator includes an actuator stem operably coupled to the gate so that movement of the actuator stem causes the gate to move; and a measurement scale, wherein the relative respective positions between the measurement scale and another component indicate the position of the gate and thus the choke position based thereupon.

In an exemplary embodiment, the measurement scale is stationary, the electric actuator further includes a bar connected to the actuator stem and movable therewith, and the bar is the another component so that the position of the bar, relative to the measurement scale, indicates the position of the gate and thus the choke position based thereupon.

In another exemplary embodiment, the choke apparatus further includes an adapter connected to each of the bonnet assembly and the electric actuator, the adapter including a plate; wherein the measurement scale is formed in, or connected to, at least the actuator stem so that the measurement scale is movable with the actuator stem; and wherein the plate is the another component so that the position of the actuator stem and thus the measurement scale, relative to the plate, indicates the position of the gate and thus the choke position based thereupon.

In a fifth aspect, there is provided a choke apparatus that includes a choke body through which fluid is adapted to flow, the choke body including a seat; a bonnet assembly connected to the choke body, the bonnet assembly including a gate adapted to move, relative to the seat, to control imposition of backpressure on the fluid when the fluid flows through the choke body; and an electric actuator operably coupled to the bonnet assembly so that the electric actuator is adapted to cause the gate to move, relative to the seat, to control the imposition of backpressure on the fluid when the fluid flows through the choke body, wherein the electric actuator includes: an electric motor; a gearbox operably coupled to the electric motor, wherein the electric motor is adapted to drive the gearbox; a linear actuator operably coupled to the gearbox, and operably coupled to the bonnet assembly to operably couple the electric actuator to the bonnet assembly, wherein the gearbox is adapted to drive the linear actuator to cause the gate to move; a clutch operably coupled to the gearbox, and a stem having: a first position in which the stem is operably decoupled from the clutch; and a second position in which the stem is operably coupled to the clutch to provide manual override.

In an exemplary embodiment, a torque is adapted to be applied to the stem when the stem is in the second position; wherein the stem is permitted to drive the gearbox to cause the gate to move, thereby providing the manual override, when the stem is in the second position and the torque applied to the stem is less than a predetermined maximum value; and wherein the clutch is adapted to slip so that the stem is no longer permitted to drive the gearbox, thereby preventing damage to at least one of: the gearbox, the linear actuator, and the bonnet assembly, when the stem is in the second position and the torque applied to the stem reaches the predetermined maximum value.

In another exemplary embodiment, when the stem is in the second position and the torque applied to the stem is less than the predetermined maximum value, the manual override is provided so long as the electric motor is not energized.

In a sixth aspect, a method of assembling an electric-actuated choke is provided, the method including providing a choke body, the choke body defining a longitudinal axis; connecting a bonnet assembly to the choke body, the bonnet assembly including a choke stem; operably coupling an electric actuator to the bonnet assembly, the electric actuator including an actuator stem, wherein operably coupling the electric actuator to the bonnet assembly includes operably coupling the actuator stem to the choke stem; and connecting the electric actuator to the bonnet assembly so that the actuator stem and the choke stem are generally coaxial along the longitudinal axis defined by the choke body.

In an exemplary embodiment, the electric-actuated choke is an electric-actuated drilling choke.

In another exemplary embodiment, operably coupling the actuator stem to the choke stem includes toollessly operably coupling the actuator stem to the choke stem.

In yet another exemplary embodiment, toollessly operably coupling the actuator stem to the choke stem includes receiving a cap of the choke stem within a first opening of the actuator stem.

In certain exemplary embodiments, toollessly operably coupling the actuator stem to the choke stem further includes: disposing a portion of the cap within a cavity formed in an inside surface of the actuator stem, the inside surface being defined by a second opening of the actuator stem, the second opening intersecting the first opening; wherein the cavity defines a first axially-facing surface; wherein a second axially-facing surface, which is spaced in a parallel relation from the first axially-facing surface, is at least partially defined by the cavity; and wherein the portion of the cap is disposed within the cavity so that the portion of the cap is disposed between the first and second axially-facing inside surfaces to toollessly operably couple the actuator stem to the choke stem.

In an exemplary embodiment, the first opening of the actuator stem is not generally coaxial with the longitudinal axis of the choke body; wherein the second opening of the actuator stem is generally coaxial with the longitudinal axis of the choke body.

In another exemplary embodiment, connecting the electric actuator to the bonnet assembly includes: connecting an adapter to the electric actuator; connecting the adapter to the bonnet assembly; wherein the connection between the adapter and the bonnet assembly permits the adapter, and thus the electric actuator, to rotate relative to the bonnet assembly.

In yet another exemplary embodiment, the bonnet assembly includes a bonnet plate; wherein connecting the electric actuator to the bonnet assembly includes: connecting an adapter to the electric actuator; and connecting the adapter to the bonnet plate so that external alignment shoulders of the bonnet plate mate against internal alignment shoulders, respectively, of the adapter to align the bonnet plate with the adapter.

In a seventh aspect, a method of retrofitting a choke apparatus is provided, the choke apparatus including a choke body, the method including disconnecting a hydraulic actuator from the choke body, including disconnecting a first bonnet assembly from the choke body; connecting a second bonnet assembly to the choke body, the second bonnet assembly including a choke stem; and operably coupling an electric actuator to the second bonnet assembly, the electric actuator including an actuator stem, wherein operably coupling the electric actuator to the second bonnet assembly includes operably coupling the actuator stem to the choke stem.

In an exemplary embodiment, operably coupling the actuator stem to the choke stem includes toollessly operably coupling the actuator stem to the choke stem.

In another exemplary embodiment, the method further includes connecting the electric actuator to the second bonnet assembly so that the actuator stem and the choke stem are generally coaxial along a longitudinal axis defined by the choke body.

In yet another exemplary embodiment, connecting the electric actuator to the second bonnet assembly includes: connecting an adapter to the electric actuator; and connecting the adapter to the second bonnet assembly; wherein the connection between the adapter and the second bonnet assembly permits the adapter, and thus the electric actuator, to rotate relative to the second bonnet assembly.

In certain exemplary embodiments, the second bonnet assembly includes a bonnet plate; wherein connecting the electric actuator to the second bonnet assembly includes: connecting an adapter to the electric actuator; and connecting the adapter to the bonnet plate so that external alignment shoulders of the bonnet plate mate against internal alignment shoulders, respectively, of the adapter to align the bonnet plate with the adapter.

In an eighth aspect, there is provided a method of effecting relative movement between a choke body and an electric actuator adapted to be operably coupled thereto, the method comprising connecting a gantry to the choke body; connecting the gantry to the electric actuator so that the choke body supports the electric actuator via the gantry; and maneuvering the gantry to displace the electric actuator relative to the choke body; wherein maneuvering the gantry to displace the electric actuator relative to the choke body comprises displacing the electric actuator along at least one of: a first axis; a second axis that extends perpendicular to the first axis; and a trajectory that extends about the choke body in a plane that is perpendicular to the second axis.

In an exemplary embodiment, the first axis extends horizontally and the second axis extends vertically.

In another exemplary embodiment, maneuvering the gantry to displace the electric actuator relative to the choke body comprises displacing the electric actuator along at least two of: the first axis; the second axis that extends perpendicular to the first axis; and the trajectory that extends about the choke body in the plane that is perpendicular to the second axis.

In yet another exemplary embodiment, maneuvering the gantry to displace the electric actuator relative to the choke body comprises displacing the electric actuator along at least three of: the first axis; the second axis that extends perpendicular to the first axis; and the trajectory that extends about the choke body in the plane that is perpendicular to the second axis.

In a ninth aspect, there is provided a choke apparatus, comprising a choke body; an electric actuator adapted to be operably coupled to the choke body; and a gantry connected to each of the choke body and the electric actuator so that the choke body supports the electric actuator via the gantry; wherein the electric actuator and at least a portion of the gantry are adapted to be displaced relative to the choke body and along at least one of: a first axis; a second axis that extends perpendicular to the first axis; and a trajectory that extends about the choke body in a plane that is perpendicular to the second axis.

In an exemplary embodiment, the first axis extends horizontally and the second axis extends vertically.

In another exemplary embodiment, the gantry comprises a base assembly connected to the choke body; and a carrier assembly connected to the electric actuator, the carrier assembly being rotatably coupled to, and supported by, the base assembly.

In yet another exemplary embodiment, the base assembly comprises a base plate to which the carrier plate is rotatably coupled, the base plate being anchored to the choke body via a plurality of support arms.

In certain exemplary embodiments, the carrier assembly comprises a carrier plate operably coupled to the base assembly, the carrier plate being adapted to rotate relative to the base assembly; the electric actuator and the at least a portion of the gantry are adapted to be displaced relative to the choke body and along the trajectory; and, when the electric actuator and the at least a portion of the gantry are displaced relative to the choke body and along the trajectory, the carrier plate rotates relative to the base assembly.

In an exemplary embodiment, the carrier assembly comprises a carrier plate operably coupled to the base assembly, and a carrier beam operably coupled to the carrier plate by a plurality of rollers, the carrier beam being adapted to be axially displaced relative to the carrier plate via the plurality of rollers; the electric actuator and the at least a portion of the gantry are adapted to be displaced relative to the choke body and along the first axis; and, when the electric actuator and the at least a portion of the gantry are displaced relative to the choke body and along the first axis, the carrier beam is axially displaced relative to the carrier plate via the plurality of rollers.

In another exemplary embodiment, the carrier assembly comprises a carrier plate operably coupled to the base assembly, a carrier beam operably coupled to the carrier plate, and a lift-shaft coupled to the carrier beam and the electric actuator, the lift-shaft being adapted to be displaced vertically relative to the carrier beam; the electric actuator and the at least a portion of the gantry are adapted to be displaced relative to the choke body and along the second axis; and, when the electric actuator and the at least a portion of the gantry are displaced relative to the choke body and along the second axis, the lift-shaft is displaced vertically relative to the carrier beam.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

DETAILED DESCRIPTION

Figure 1:
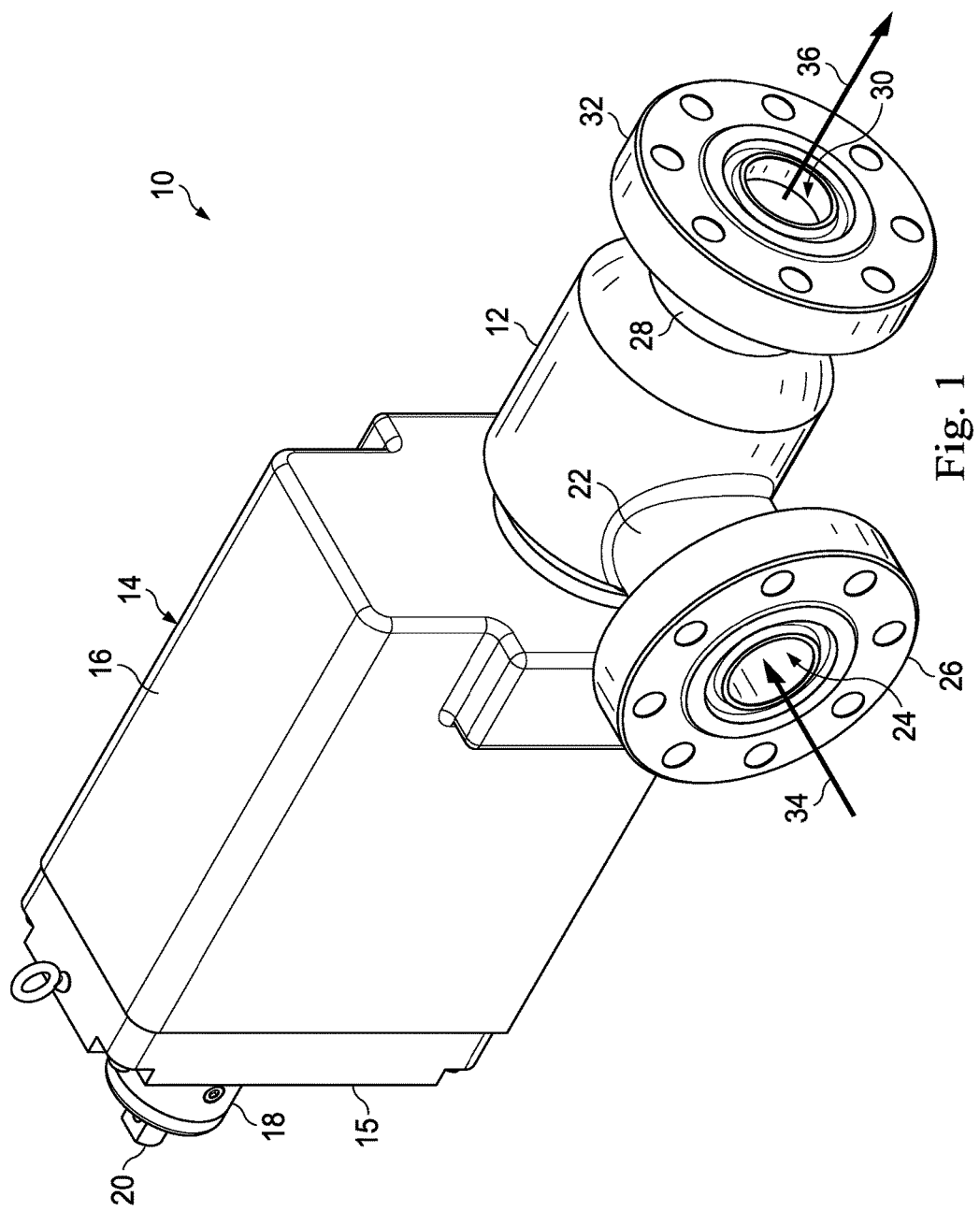
FIGS. 1 and 2 are respective perspective views of a choke apparatus, according to an exemplary embodiment.
Figure 2:
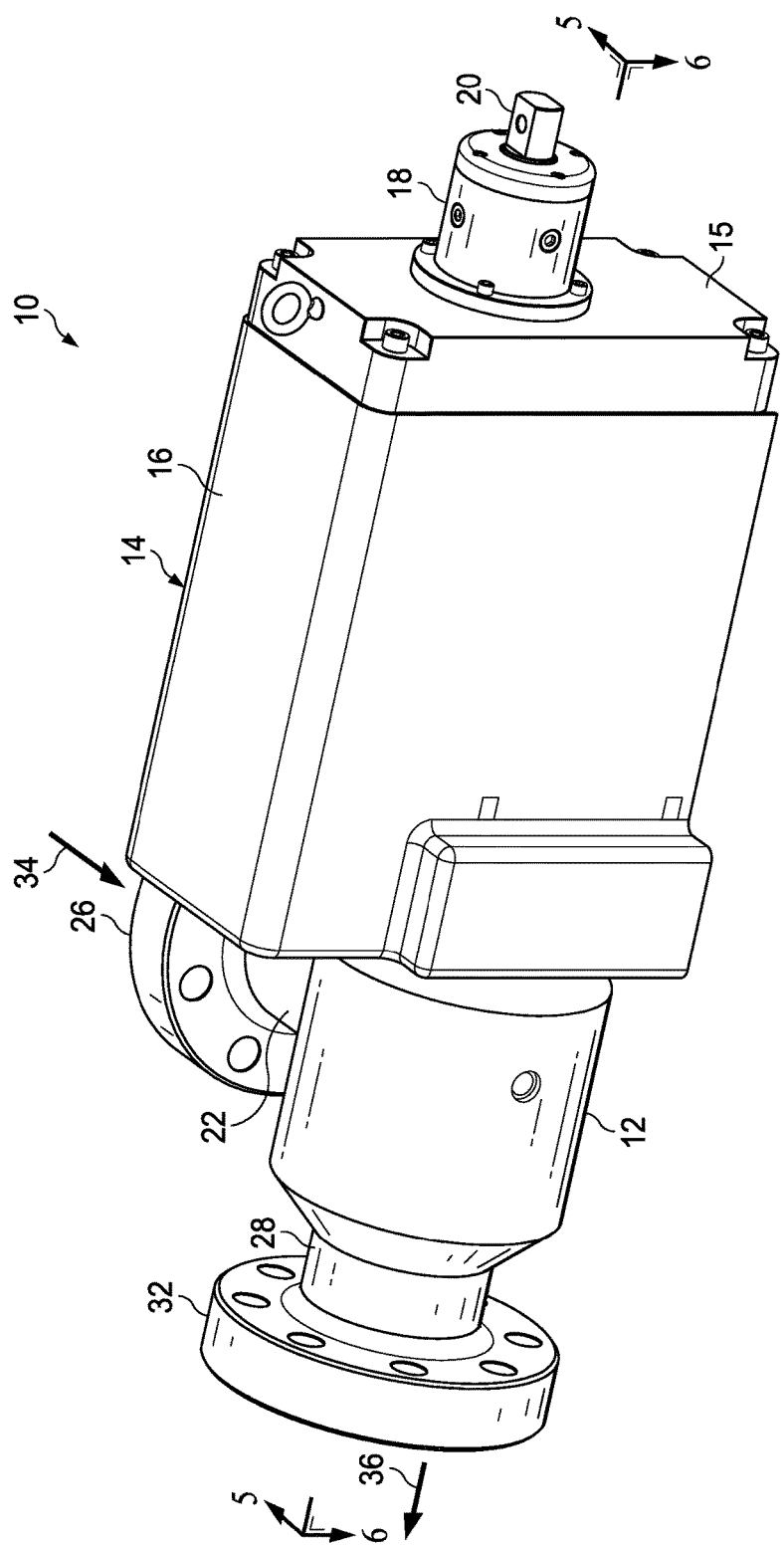

In an exemplary embodiment, as illustrated in FIGS. 1 and 2, a choke apparatus is generally referred to by the reference numeral 10 and includes a choke body 12 and an electric actuator 14 operably coupled thereto. The electric actuator 14 includes a gearbox 15 spaced from the choke body 12, and a case 16 extending between the choke body 12 and the gearbox 15. A clutch 18 is operably coupled to the gearbox 15. A sliding stem 20 is adapted to be operably coupled to the clutch 18 to provide manual override. The choke body 12 includes an inlet port 22 defining an inlet fluid passage 24 and including an inlet flange 26, and further includes an outlet port 28 defining an outlet fluid passage 30 and including an outlet flange 32.

In several exemplary embodiments, the choke apparatus 10 is an electric-actuated drilling choke. As will be described in further detail below, in several exemplary embodiments, the choke apparatus 10 is configured to operate as an electric-actuated drilling choke for oil and gas exploration and production operations, during which drilling fluid or mud is circulated down through a drilling or casing string that extends within a wellbore, and up through an annular region defined between the wellbore and the drilling or casing string. The choke apparatus 10 is used to control the imposition of backpressure on the drilling fluid. As shown in FIGS. 1 and 2, the drilling fluid flows into the choke body 12 via the inlet fluid passage 24, as indicated by arrow 34, and flows out of the choke body 12 via the outlet fluid passage 30, as indicated by arrow 36. In several exemplary embodiments, the drilling fluid flows into the choke body 12, as indicated by the arrow 34, via one or more fluid lines that are connected to the inlet flange 26 of the inlet port 22. Similarly, in several exemplary embodiments, the drilling fluid flows out of the choke body 12, as indicated by the arrow 36, via one or more fluid lines that are connected to the outlet flange 32 of the outlet port 28.

Figure 3:
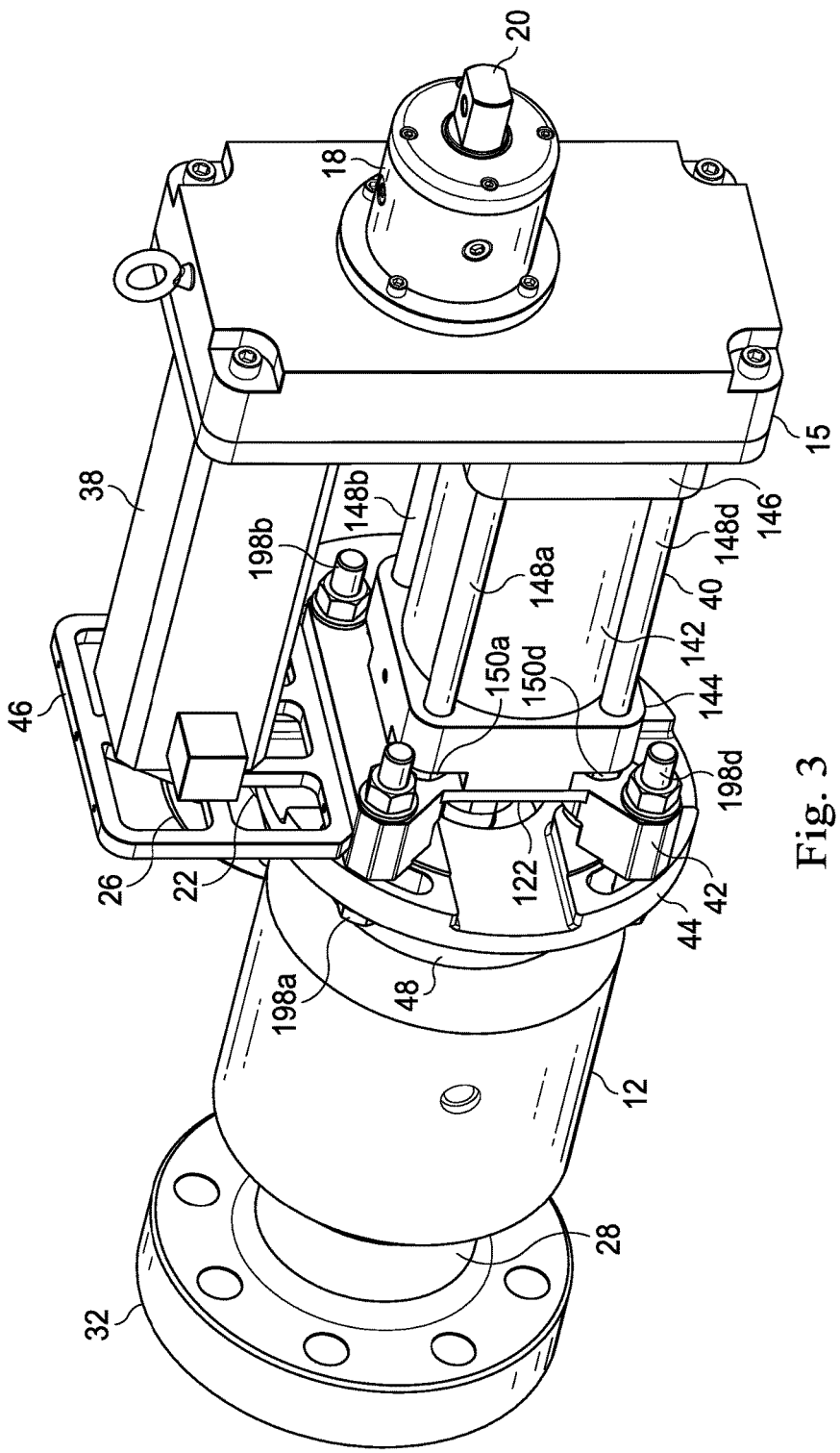
FIGS. 3 and 4 are perspective and elevational views, respectively, of the choke apparatus of FIGS. 1 and 2 but with a case omitted to illustrate additional components of the choke apparatus, according to an exemplary embodiment.
Figure 4:
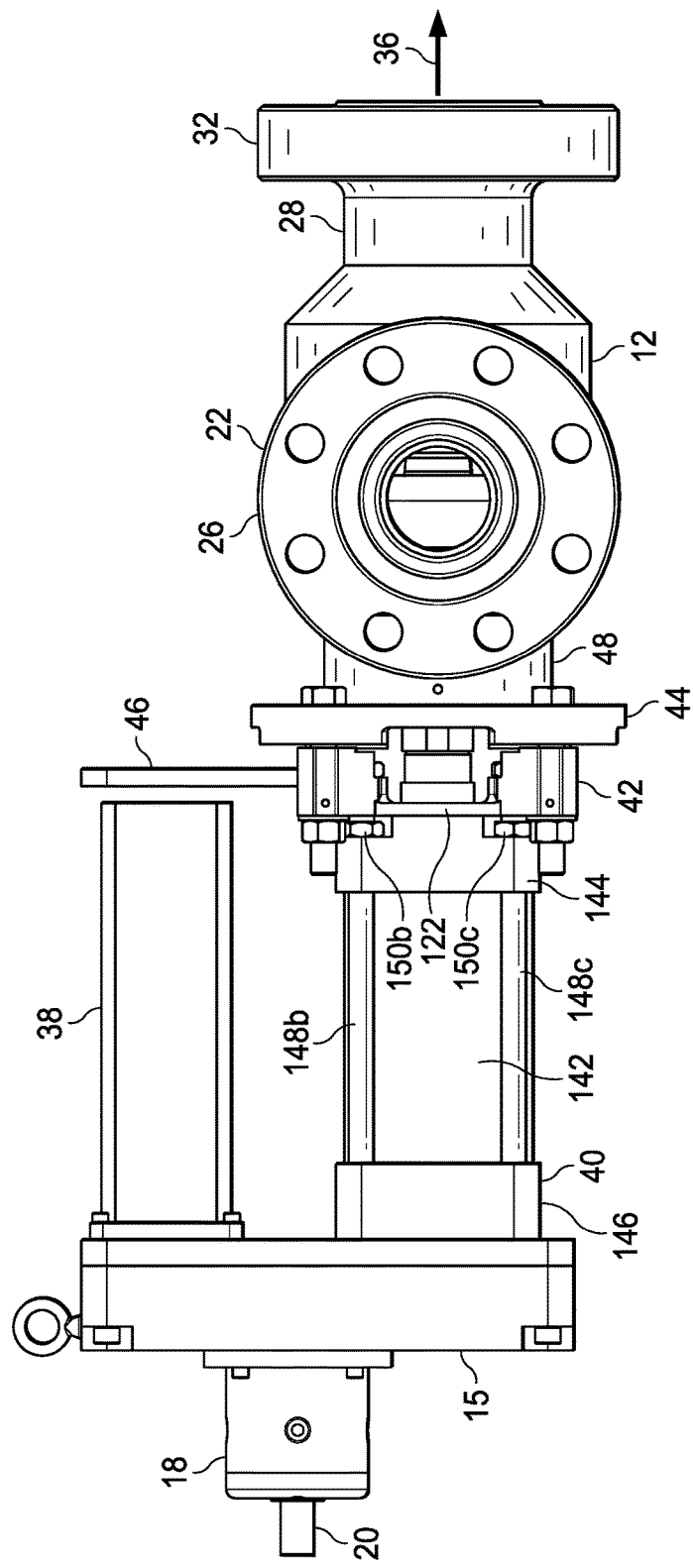

As noted above, FIGS. 3 and 4 are perspective views of the choke apparatus 10 of FIGS. 1 and 2, but with the case 16 omitted to illustrate additional components of the choke apparatus 10. In an exemplary embodiment, as illustrated in FIGS. 3 and 4 with continuing reference to FIGS. 1 and 2, the choke apparatus 10 further includes a motor 38, which is operably coupled to the gearbox 15. A linear actuator, such as linear roller screw assembly 40, is also operably coupled to the gearbox 15. As shown in FIGS. 3 and 4, the motor 38 and the linear roller screw assembly 40 are spaced in a generally parallel relation, with respective end portions thereof being operably coupled to opposing end portions, respectively, of the gearbox 15. An adapter 42 is connected to the linear roller screw assembly 40 at the end thereof opposing the gearbox 15. A bonnet assembly 44 is connected to the adapter 42, and also to the choke body 12. In an exemplary embodiment, one or more components of the bonnet assembly 44 may be connected to the choke body 12 by being integrally formed with the choke body 12. The linear roller screw assembly 40 is connected to the bonnet assembly 44 using the adapter 42. The linear roller screw assembly 40 is operably coupled to the bonnet assembly 44 and the choke body 12. A case support bracket 46 is connected to the top surface of the adapter 42.

In several exemplary embodiments, at least the motor 38, the gearbox 15, the case 16, the clutch 18, the linear roller screw assembly 40, the case support bracket 46, and the adapter 42 together form the electric actuator 14, which is operably coupled to the bonnet assembly 44 and the choke body 12 to form the drilling choke 10. In several exemplary embodiments, the combination of at least the motor 38, the gearbox 15, the clutch 18, and the linear roller screw assembly 40 forms the electric actuator 14, which is operably coupled to the bonnet assembly 44 and the choke body 12; in an exemplary embodiment, the adapter 42 is part of the electric actuator 14. In several exemplary embodiments, one or more of the motor 38, the gearbox 15, the clutch 18, and the linear roller screw assembly 40 together constitute the electric actuator 14, which is operably coupled to the bonnet assembly 44 and the choke body 12; in an exemplary embodiment, the adapter 42 is part of the electric actuator 14.

Figure 5:
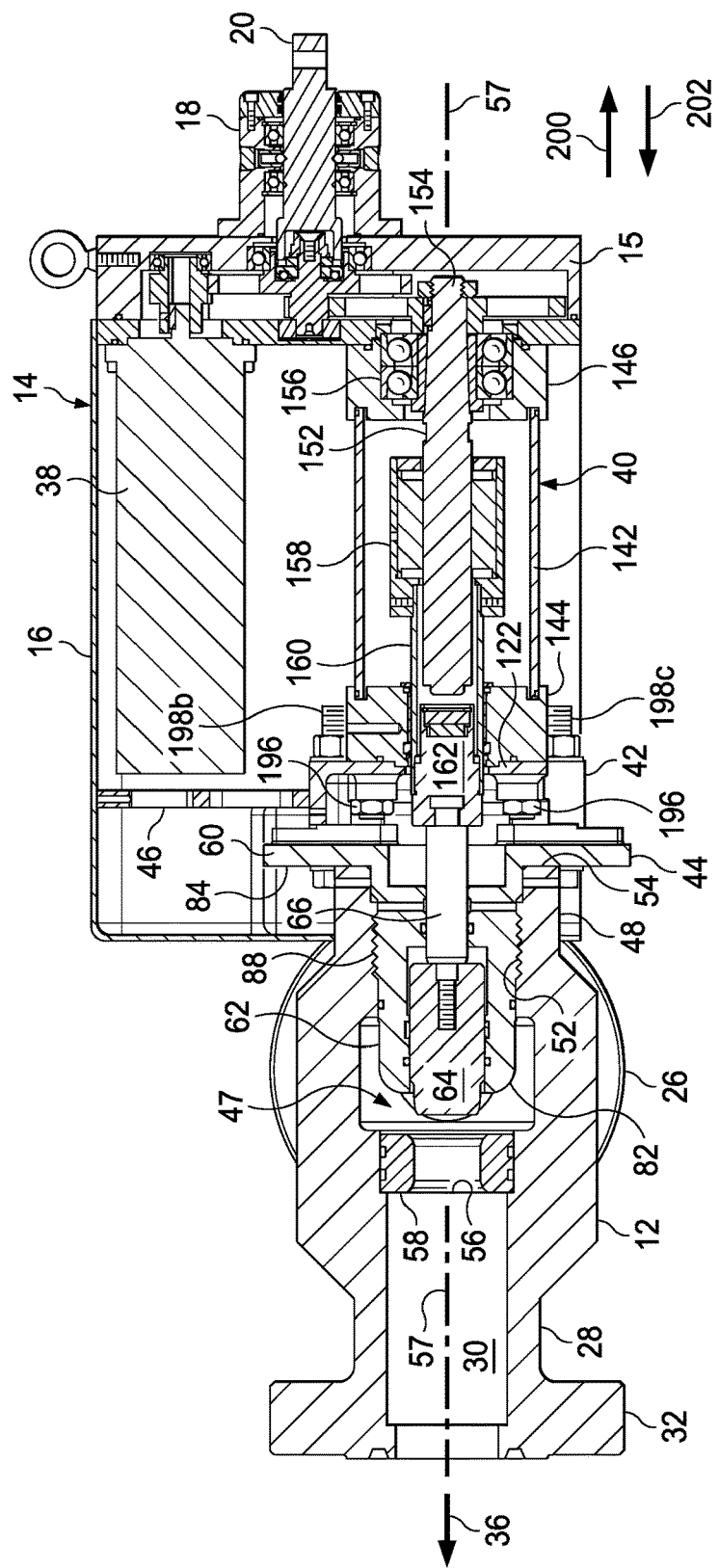
FIG. 5 is a sectional view of the choke apparatus of FIGS. 1 and 2 taken along line 5-5 of FIG. 2, according to an exemplary embodiment.
Figure 6:
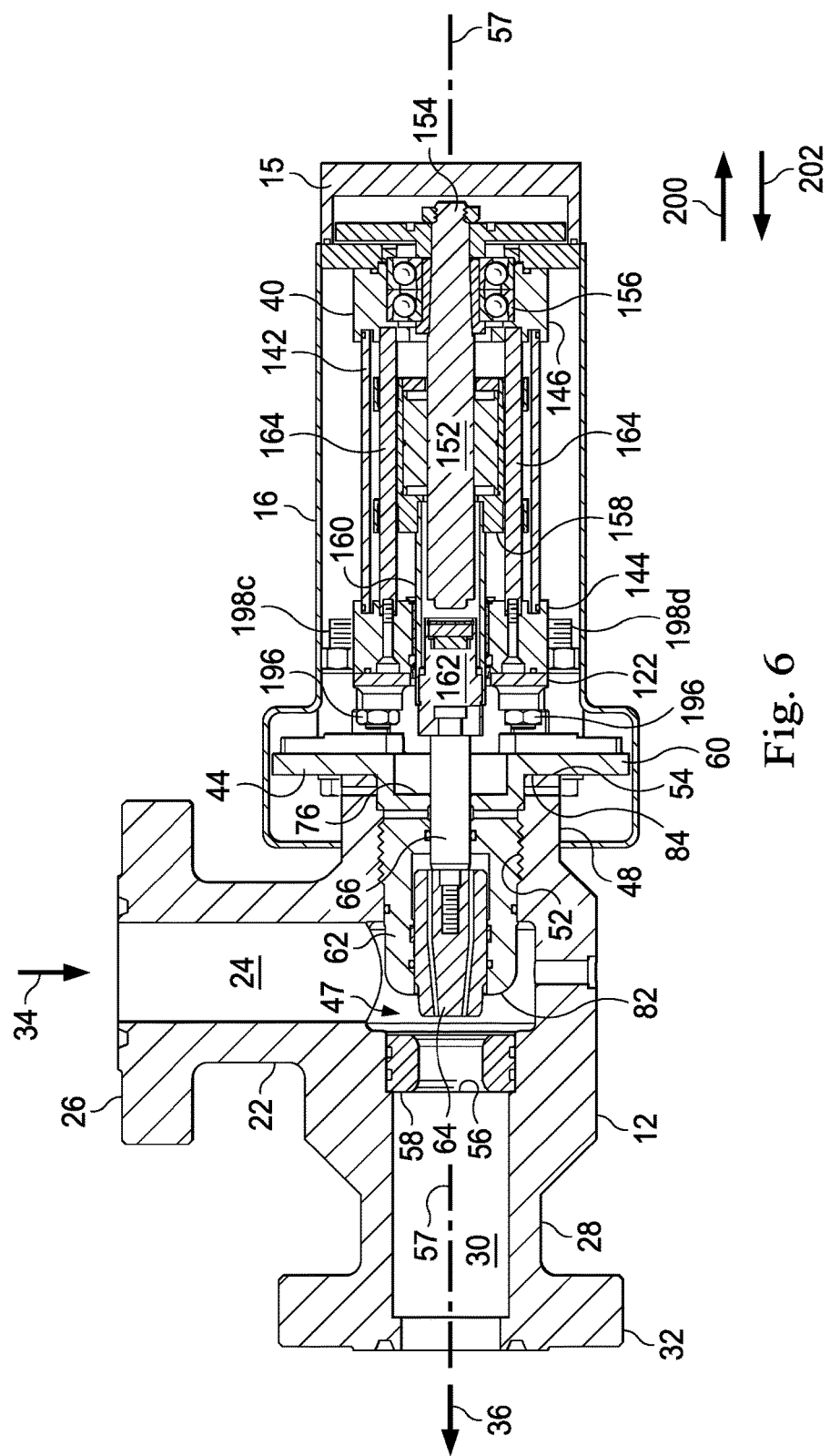
FIG. 6 is a sectional view of the choke apparatus of FIGS. 1 and 2 taken along line 6-6 of FIG. 2, according to an exemplary embodiment.
Figure 7:
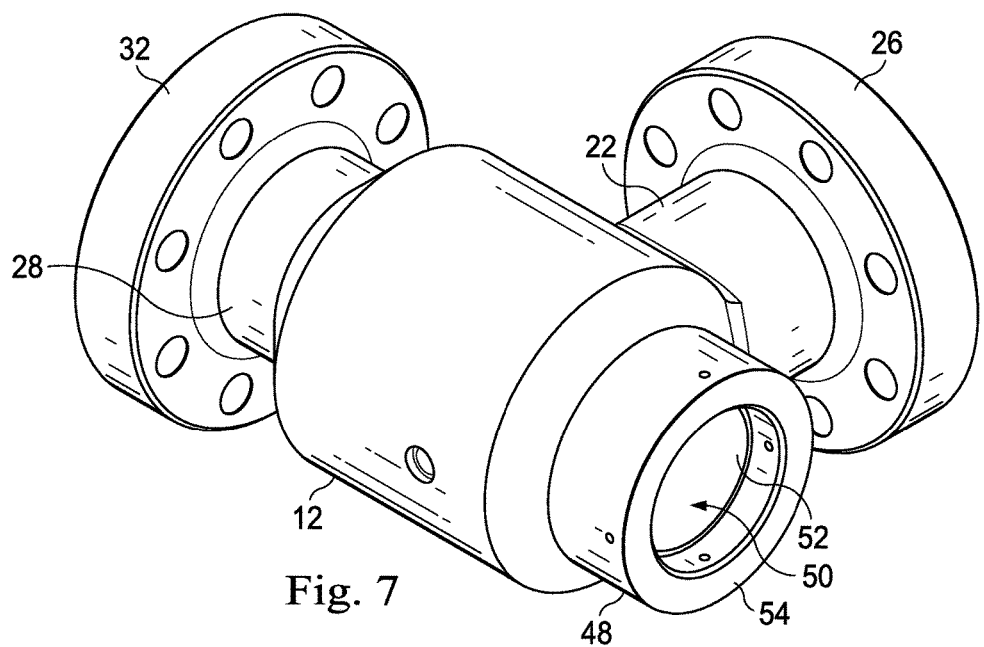
FIG. 7 is a perspective view of a choke body of the choke apparatus of FIGS. 1-6, according to an exemplary embodiment.

In an exemplary embodiment, as illustrated in FIGS. 5-7 with continuing reference to FIGS. 1-4, the choke body 12 defines an internal region 47, which is in fluid communication with each of the inlet fluid passage 24 and the outlet fluid passage 30. The choke body 12 further includes a pipe 48, which is opposite the outlet port 28. The pipe 48 defines an internal passage 50, and includes an internal threaded connection 52. The internal passage 50 is formed in an end surface 54 of the pipe 48, and extends to the internal region 47. In several exemplary embodiments, the choke body 12 is, or is compatible with, a Cameron® style drilling choke. In several exemplary embodiments, the choke body 12 is, or is compatible with, a Cameron® style hydraulic drilling choke. In several exemplary embodiments, the choke body 12 is, or is compatible with, one or more different styles of drilling chokes.

As shown in FIGS. 5 and 6, an internal counterbore 56 is formed in the choke body 12, between the internal region 47 and the outlet fluid passage 30. The counterbore 56 is coaxial with the outlet fluid passage 30 along a longitudinally-extending center axis 57. The choke body 12 further includes a seat 58, which extends within the counterbore 56. In an exemplary embodiment, the seat 58 is a tungsten carbide seat. In an exemplary embodiment, instead of, or in addition to tungsten carbide, the seat 58 is composed of one or more other materials. In an exemplary embodiment, the seat 58 is composed of one or more hard face materials or equivalent(s) thereof. In an exemplary embodiment, the seat 58 is composed of one or more surface hardened materials or equivalent(s) thereof.

In an exemplary embodiment, as illustrated in FIGS. 8-11 with continuing reference to FIGS. 1-7, the bonnet assembly 44 includes a circular bonnet plate 60, a sealing assembly 62, a gate 64, and a choke stem 66. Circumferentially-spaced, curved slotted openings 68a-d are formed through the bonnet plate 60. A cross-shaped recess 70 is formed in a side surface 72 of the bonnet plate 60, defining a cross-shaped surface 74 and forming non-contiguous portions 72a-d of the surface 72. A circular recess 76 is formed in the cross-shaped surface 72 at the center of the bonnet plate 60, defining a circular surface 78. Circumferentially-spaced, curved external alignment shoulders 80a-d are formed in the portions 72a-d, respectively, of the side surface 72. The circumferential positions of the alignment shoulders 80a-d correspond to the circumferential positions of the slotted openings 68a-d, respectively. The alignment shoulders 80a-d are generally coaxial with the slotted openings 68a-d, respectively. The alignment shoulders 80a-d are radially positioned between the circular recess 76 and the slotted openings 68a-d, respectively. The external alignment shoulders 80a-d are coaxial and together define a circumference about the axial center line of the internal recess 76.

The sealing assembly 62 includes a nose 82, which protrudes from a side surface 84 of the bonnet plate 60, the side surface 84 opposing the side surface 72. A sealing element 86 extends circumferentially around the nose 82. An external threaded connection 88 is formed on the outside surface of the nose 82, and is positioned between the bonnet plate 60 and the sealing element 86. In an exemplary embodiment, as shown in FIG. 8-11, the nose 82 is integrally formed with the bonnet plate 60. In another exemplary embodiment, the nose 82 is connected to the bonnet plate 60. As shown in FIG. 10, a bore 90 is formed in a distal end surface 92 of the nose 82, extending therewithin and towards the bonnet plate 60. As noted above, the circular recess 76 defines the circular surface 78; the circular surface 78 may be an end surface of the nose 82 that opposes the distal end surface 92. A bore 93 is formed in the circular surface 78, and extends to the bore 90.

In several exemplary embodiments, the nose 82 is compatible with any Cameron® style drilling choke. In several exemplary embodiments, the nose 82 is compatible with any Cameron® style hydraulic drilling choke. In several exemplary embodiments, the nose 82 is compatible with one or more different styles of drilling chokes.

Figure 11:
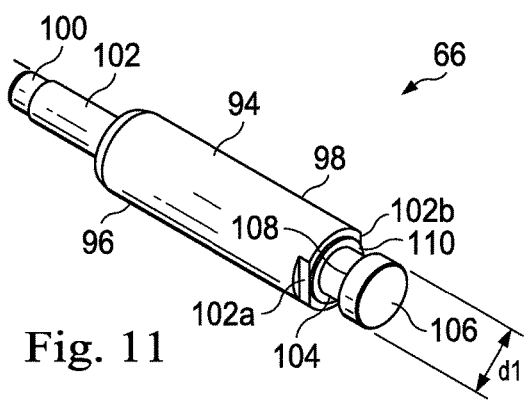
FIG. 11 is a perspective view of a choke stem of the bonnet assembly of FIGS. 8-10, according to an exemplary embodiment.

As shown most clearly in FIGS. 10 and 11, the choke stem 66 includes an axially-extending enlarged-diameter portion 94 having opposing end portions 96 and 98. A protrusion 100 extends away from the end portion 96 of the enlarged-diameter portion 94, and includes an external threaded connection 102. Parallel-spaced flats 102a and 102b are formed in the end portion 98 of the enlarged-diameter portion 94. A protrusion 104 extends away from the end portion 98, and a cylindrical cap 106 is connected to the protrusion 104. The cylindrical cap 106 defines an annular surface 108 adjacent the intersection between the protrusion 104 and the cylindrical cap 106. The cylindrical cap 106 defines an outside diameter d1. The end portion 98 defines an annular surface 110 adjacent the intersection between the end portion 98 and the protrusion 104. The annular surfaces 108 and 110 are spaced in a parallel relation, and face each other.

Figure 8:
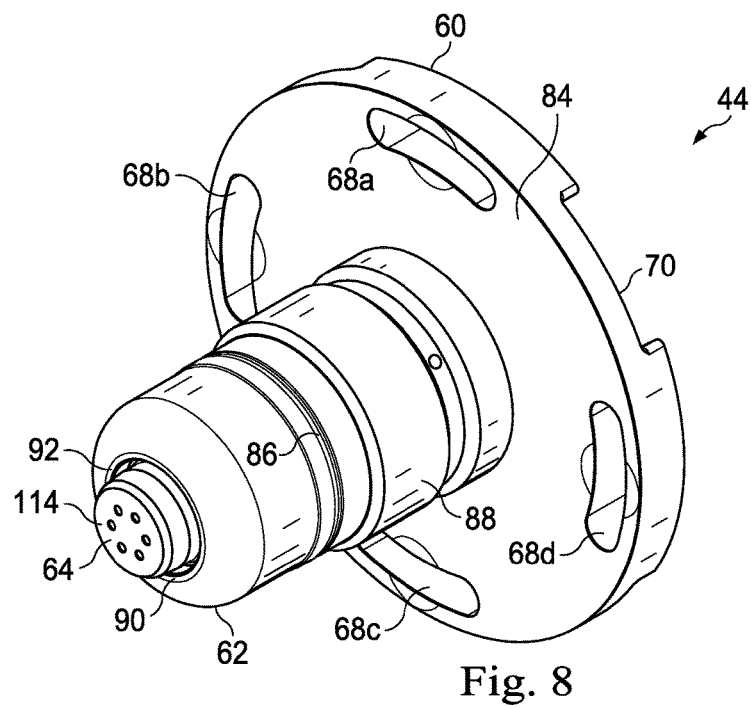
FIGS. 8 and 9 are respective perspective views of a bonnet assembly of the choke apparatus of FIGS. 1-6, according to an exemplary embodiment.

As shown most clearly in FIGS. 8 and 10, the gate 64 includes opposing end surfaces 114 and 116. A bore 118 is formed in the end surface 116. An internal threaded connection 120 is formed in an inside surface of the gate 64 defined by the bore 118. In an exemplary embodiment, the gate 64 is a tungsten carbide gate.

Figure 9:
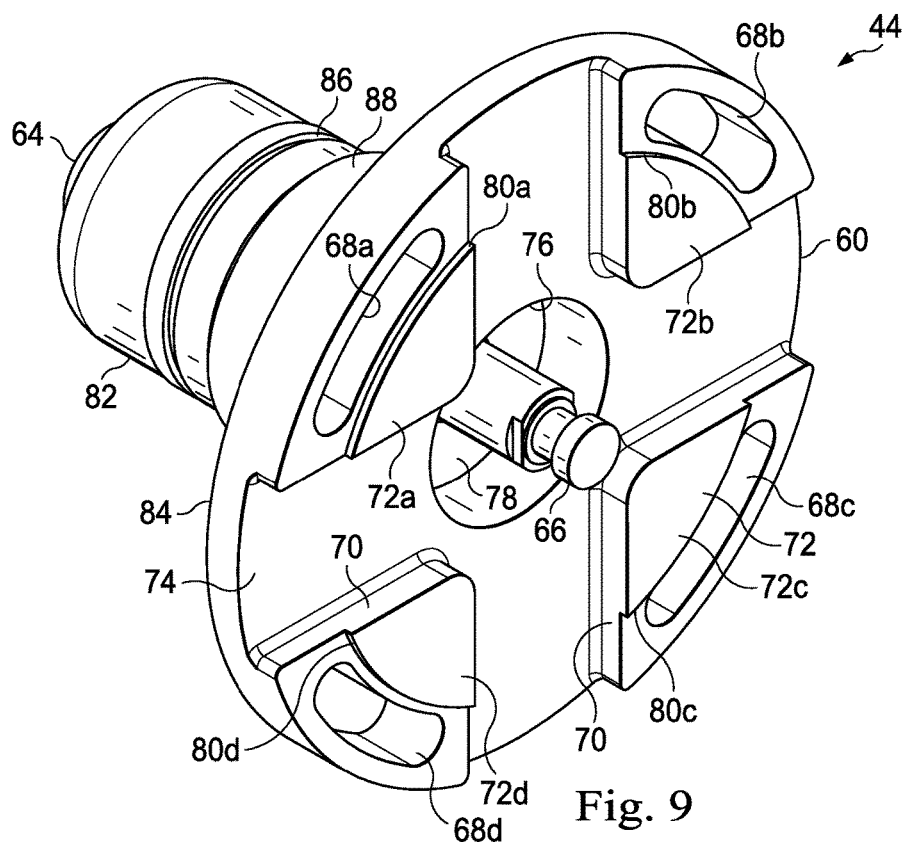
Figure 10:
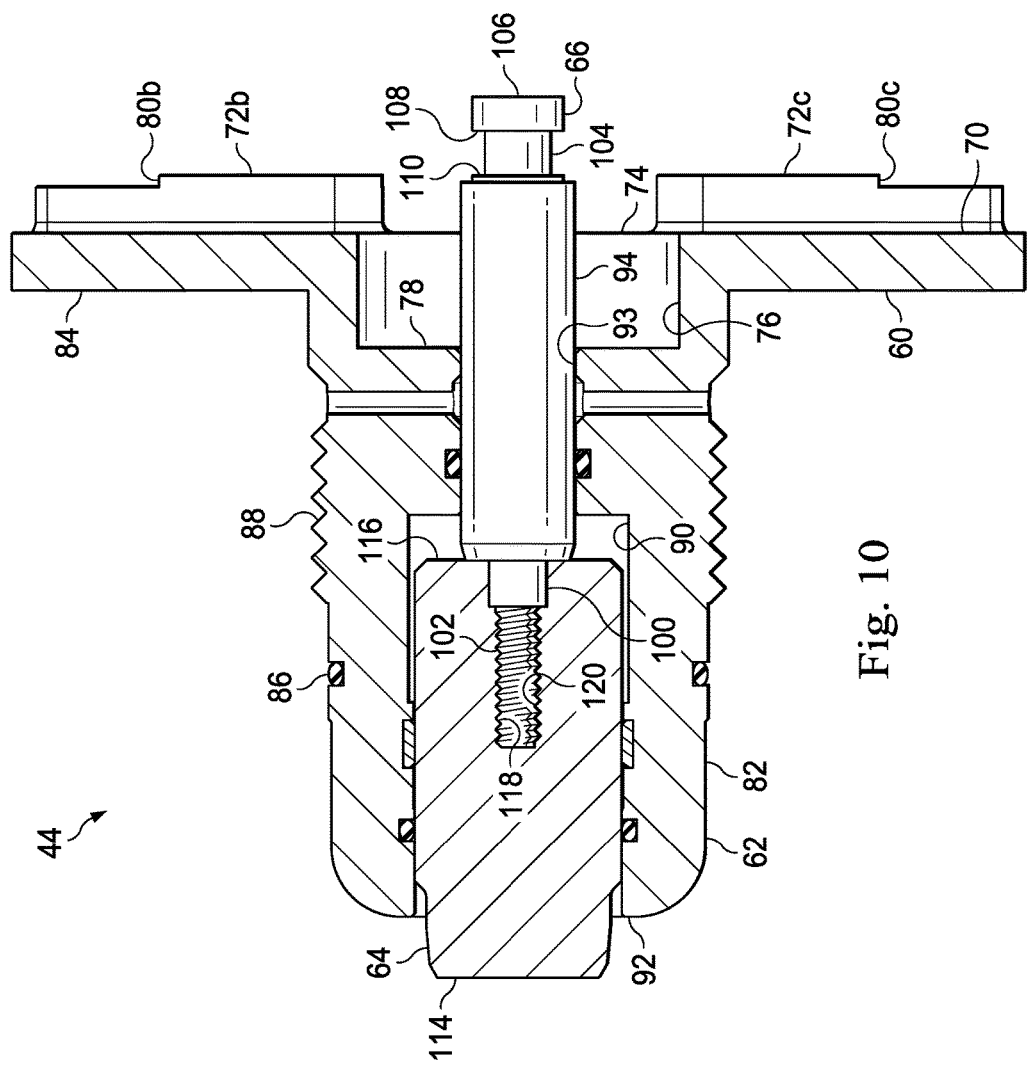
FIG. 10 is a sectional view of the bonnet assembly of FIGS. 8 and 9, according to an exemplary embodiment.

In an exemplary embodiment, when the bonnet assembly 44 is in its assembled condition as shown in FIGS. 8-10, the gate 64 extends within the bore 90. The end surface 114 of the gate 64 is positioned outside of the bore 90, being axially offset from the distal end surface 92 of the nose 82. The end surface 116 is disposed within the bore 90. The choke stem 66 extends through the recess 76, through the bore 93, and into the bore 118 of the gate 64. More particularly, the enlarged-diameter portion 94 extends through the recess 76 and the bore 93, and the protrusion 100 extends into the bore 118 of the gate 64. The external threaded connection 102 of the choke stem 66 is threadably engaged with the internal threaded connection 120 of the gate 64, thereby connecting the gate 64 to the choke stem 66. In an exemplary embodiment, to assemble the bonnet assembly 44, the gate 64 is positioned so that the end surface 116 is disposed within the bore 90, the choke stem 66 is inserted through the bore 93 and into the bore 118, and the choke stem 66 is rotated so that the external threaded connection 102 thereof threadably engages with the internal threaded connection 120 of the gate 64. During this assembly, a tool, such as a wrench, may be engaged with the flats 102a and 102b and used to screw the choke stem 66 into the gate 64. Under conditions to be described below, the choke stem 66 and the gate 64 are adapted to move, relative to the bonnet plate 60 and the sealing assembly 62, in the left and right directions as viewed in FIG. 10.

Figure 12:
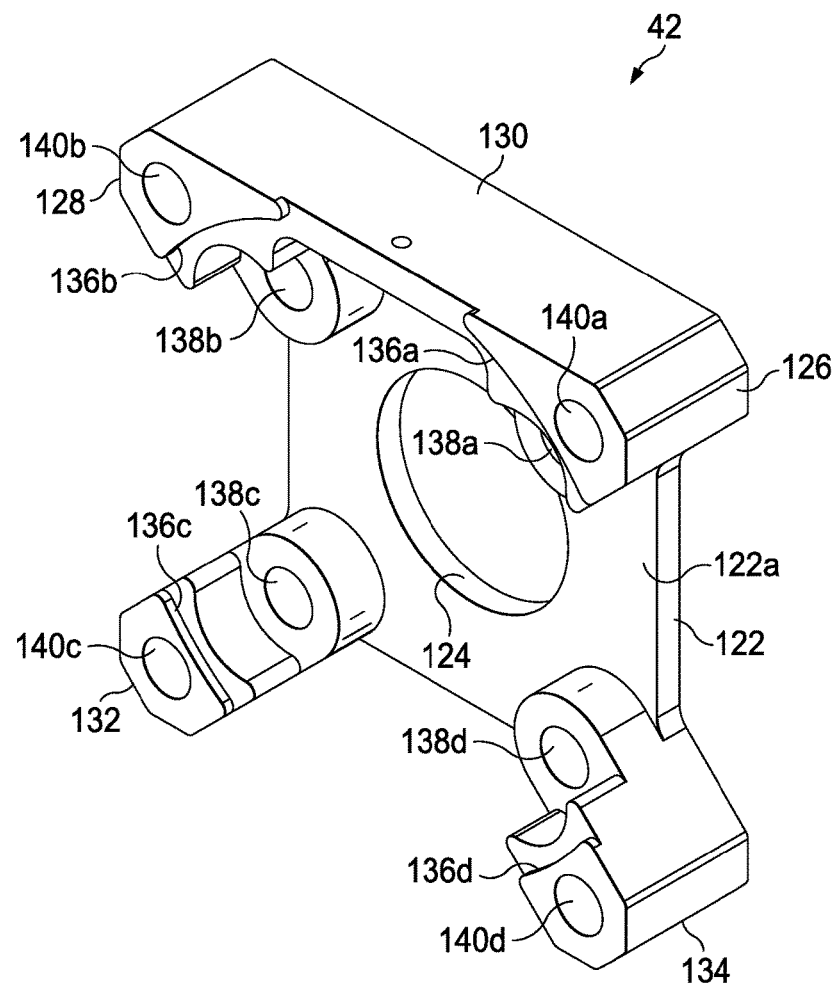
FIG. 12 is a perspective view of an adapter of the choke apparatus of FIGS. 1-6, according to an exemplary embodiment.

In an exemplary embodiment, as illustrated in FIG. 12 with continuing reference to FIGS. 1-11, the adapter 42 includes a plate 122 and an opening 124 formed therethrough at the center thereof. Corner support blocks 126 and 128 extend from respective upper corners of the plate 122. A horizontally-extending wall 130 extends between the corner support blocks 126 and 128, and along the upper side of the plate 122, defining the top surface to which the case support bracket 46 (shown in FIGS. 3-5) is connected. Corner support blocks 132 and 134 extend from the lower corners, respectively, of the plate 122. Circumferentially-spaced, curved internal alignment shoulders 136a and 136b are formed in the corner support blocks 126 and 128, respectively. Likewise, circumferentially-spaced, curved internal alignment shoulders 136c and 136d are formed in the corner support blocks 132 and 134, respectively. The internal alignment shoulders 136a-d are coaxial and together define a circumference about the center point of the opening 124. Inner corner bores 138a-d are formed through the corner support blocks 126, 128, 132, and 134, respectively. The inner corner bores 138a-d are proximate the internal alignment shoulders 136a-d, respectively. Outer corner bores 140a-d are formed through the corner supports blocks 126, 128, 132, and 134, respectively. The outer corner bores 140a-140d are proximate the internal alignment shoulders 136a-d, respectively. Each of the internal alignment shoulders 136a-d is radially positioned between the corresponding pair of the inner corner bores 138a-d and the outer corner bores 140a-d. The plate 122 defines a surface 122a.

Referring back to FIGS. 3-6, in an exemplary embodiment, the linear roller screw assembly 40 includes a tubular housing 142, which extends between axially-spaced end blocks 144 and 146. The end block 146 is connected to the gearbox 15. Threaded rods 148a-d extend through the end block 144, along the tubular housing 142, and into the end block 146, threadably engaging respective internal threaded connections in the end block 146; nuts 150a-d threadably engage the respective ends of the threaded rods 148a-d that oppose the end block 146, thereby connecting the end blocks 144 and 146 together and clamping the tubular housing 142 therebetween.

As shown in FIGS. 5 and 6, the linear roller screw assembly 40 further includes a linear roller screw 152, which extends within the tubular housing 142 and through the end block 146. An end portion 154 of the linear roller screw 152 is operably coupled to the gearbox 15 so that the gearbox 15 is adapted to cause the linear roller screw 152 to rotate. A bearing assembly 156 is mounted within the end block 146. The linear roller screw 152 extends through, and is supported by, the bearing assembly 156. The linear roller screw 152 further extends through a translation component, such as a nut 158, which is disposed within the tubular housing 142 and is adapted to translate therewithin, under conditions to be described below. A tubular coupling 160 is connected to the end portion of the nut 158 opposing the end block 146. In an exemplary embodiment, an end portion of the tubular coupling 160 includes an external threaded connection, which engages an internal threaded connection provided within the nut 158. The tubular coupling 160 extends through the end block 144. An actuator stem 162 is connected to the end portion of the tubular coupling 160 opposing the nut 158 so that at least a portion of the actuator stem 162 is positioned outside of the end block 144. As shown in FIG. 6, a plurality of guide rods 164 extend between, and are connected to, the end blocks 144 and 146. The guide rods 164 extend through the nut 158 and are adapted to guide the nut 158 as it translates within the tubular housing 142; in an exemplary embodiment, the plurality of guide rods 164 includes four guide rods 164.

Figure 13:
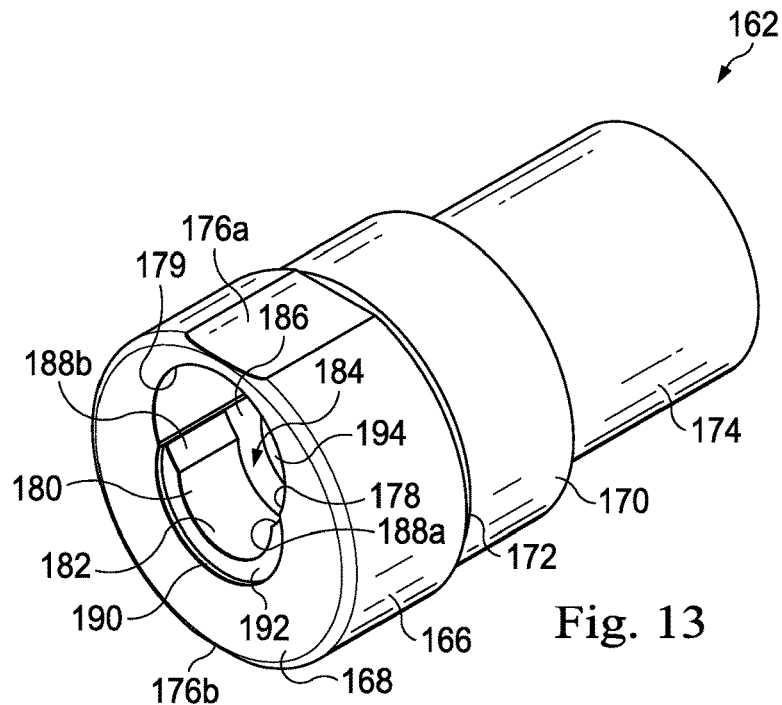
FIG. 13 is a perspective view of an actuator stem of a linear roller screw assembly of the choke apparatus of FIGS. 1-6, according to an exemplary embodiment.
Figure 14:
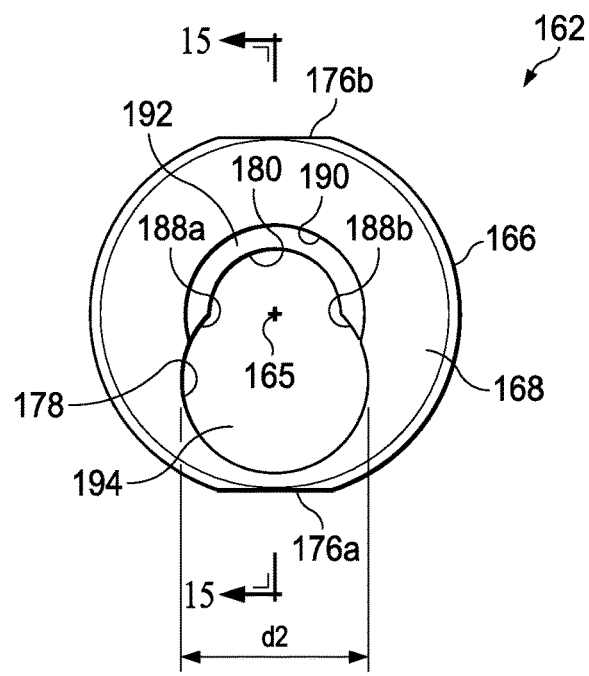
FIG. 14 is an end view of the actuator stem of FIG. 13, according to an exemplary embodiment.
Figure 15:
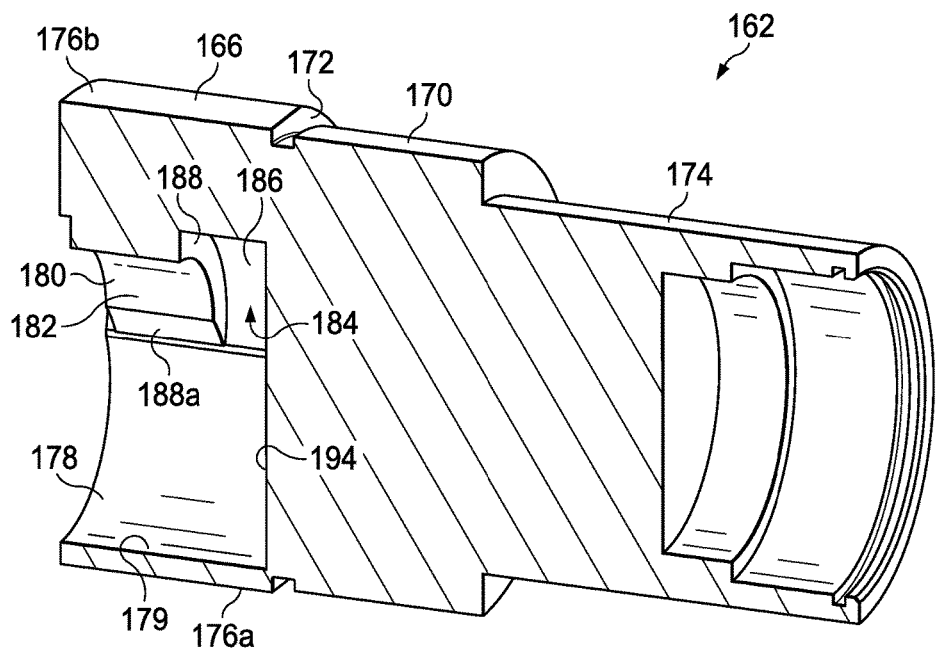
FIG. 15 is a perspective view of a section of the actuator stem of FIGS. 13 and 14, according to an exemplary embodiment.

In an exemplary embodiment, as illustrated in FIGS. 13-15 with continuing reference to FIGS. 3-6, the actuator stem 162 defines a center axis 165 (FIG. 14), and includes a cylindrical cap 166 defining an end surface 168. An external threaded connection 170 extends from cylindrical cap 166 in a direction opposite the end surface 168. An external shoulder 172 is defined proximate the intersection between the cylindrical cap 166 and the external threaded connection 170. A cylindrical portion 174 extends from the external threaded connection 170. Parallel-spaced flat surfaces 176a and 176b are formed in the cylindrical cap 166 so that the flat surfaces 176a and 176b are perpendicular to the end surface 168. An off-center opening 178 is formed in the end surface 168, and defines an inside diameter d2. The inside diameter d2 is greater than the outside diameter d1 (FIG. 11) defined by the cylindrical cap 106 of the choke stem 66. The off-center opening 178 also defines a curved inside surface 179. A center opening 180 is formed in the center of the end surface 168, and intersects the off-center opening 178. The center opening 180 defines a curved inside surface 182. A cavity 184 is formed in the curved inside surface 182, the cavity 184 defining a curved inside surface 186 and an axially-facing inside arcuate surface 188 adjacent thereto. The curved inside surface 186 defined by the cavity 184 is coaxial with the curved inside surface 182 defined by the center opening 180. Opposing curved surfaces 188a and 188b are formed at the intersection between the off-center opening 178 and the center opening 180; in an exemplary embodiment, the curved surfaces 188a and 188b are coaxial with the curved inside surface 179. The curved inside surface 182 circumferentially extends between the opposing curved surfaces 188a and 188b. A recess 190 is formed in the end surface 168, and is coaxial with the center opening 180. The recess 190 defines a recessed axially-facing surface 192. The off-center opening 178, the center opening 180, and the cavity 184 together define an axially-facing inside surface 194, which is spaced in a parallel relation from the axially-facing inside annular surface 188, as well as each of the recessed axially-facing surface 192 and the end surface 168.

Referring back to FIGS. 5 and 6, in an exemplary embodiment, when the actuator stem 162 is connected to the remainder of the linear roller screw assembly 40, the cylindrical portion 166 of the actuator stem 162 extends within the tubular coupling 160. The external threaded connection 170 is threadably engaged with an internal threaded connection adjacent the end of the tubular coupling 160 opposing the nut 158. The external shoulder 172 of the actuator stem 162 abuts the end of the tubular coupling 160 opposing the nut 158. As noted above, at least a portion of the actuator stem 162 is positioned outside of the end block 144. In particular, at least the end surface 168 is positioned outside of the end block 144.

With continuing reference to FIGS. 1-15, in an exemplary embodiment, when the choke apparatus 10 is in the assembled condition shown in FIGS. 1-6 (with the case 16 being omitted from view in FIGS. 3 and 4), as noted above: the bonnet assembly 44 is connected to the choke body 12; the adapter 42 is connected to the linear roller screw assembly 40 at the end thereof opposing the gearbox 15; the linear roller screw assembly 40 is connected to the bonnet assembly 44 using the adapter 42; and the linear roller screw assembly 40 is operably coupled to the bonnet assembly 44 and the choke body 12.

More particularly, regarding the connection of the bonnet assembly 44 to the choke body 12, the sealing assembly 62 extends within the internal passage 52 and the internal region 47 so that the end of the nose 82 opposing the bonnet plate 60 is disposed within the internal region 47. The external threaded connection 88 of the nose 82 is threadably engaged with the internal threaded connection 52 of the choke body 12, thereby connecting the bonnet assembly 44 to the choke body 12. The side surface 84 of the bonnet plate 60 abuts the end surface 54 of the pipe 48 of the choke body 12.

Regarding the connection of the adapter 42 to the linear roller screw assembly 40, the plate 122 of the adapter 42 abuts the end block 144 so that the threaded rods 148a-d extend through the inner corner bores 138a-d, respectively, of the adapter 42. Respective nuts 196 are engaged with the end portions of the threaded rods 148a-d that extend through the bores 138a-d, respectively, thereby connecting the adapter 42 to the linear roller screw assembly 40.

Regarding the connection of the linear roller screw assembly 40 to the bonnet assembly 44 using the adapter 42, the adapter 42 is mounted against the side surface 72 of the bonnet plate 60 so that the internal alignment shoulders 136a-d of the adapter 42 mate against the external alignment shoulders 80a-d, respectively, of the bonnet plate 60. Fasteners 198a-d extend through the slotted openings 68a-d, respectively, of the bonnet plate 60, and further through the outer corner bores 140a-d, respectively, of the adapter 42, thereby connecting the linear roller screw assembly 40 to the bonnet assembly 44.

Figure 16:
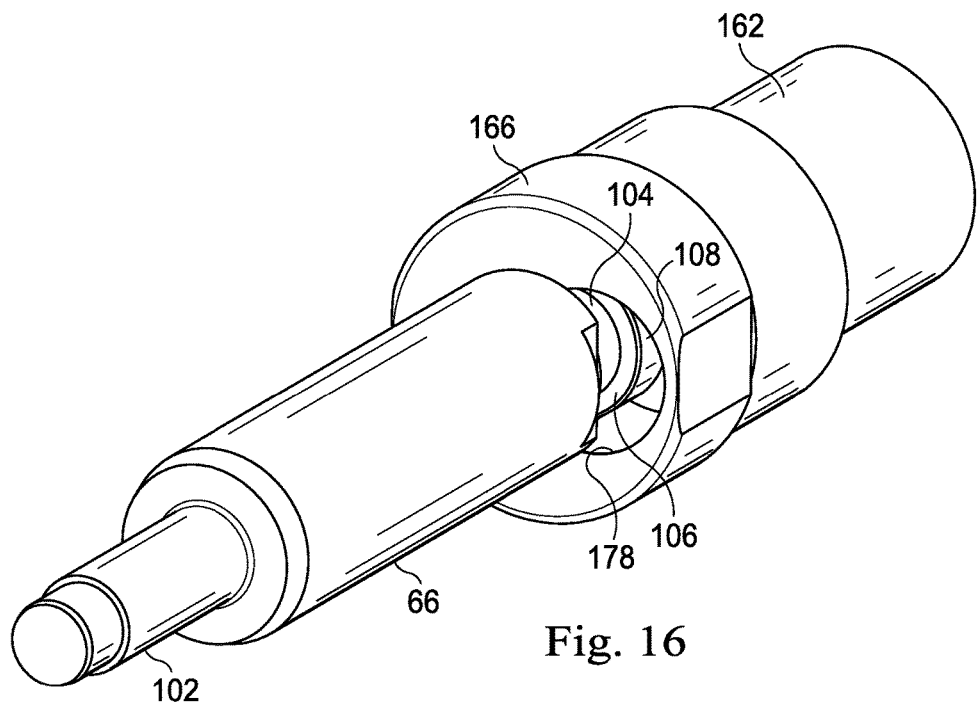
FIG. 16 is a perspective view of the operable coupling of the actuator stem of FIGS. 13-15 to the choke stem of FIG. 11, according to an exemplary embodiment.

Regarding the operable coupling of the linear roller screw assembly 40 to the bonnet assembly 44, the actuator stem 162 is toollessly operably coupled to the choke stem 66 to operably couple the linear roller screw assembly 40 to the bonnet assembly 44. Exemplary embodiments of this toolless operable coupling are illustrated in FIGS. 5, 6, and 16. More particularly, the cap 106 is received within the off-center opening 178, and a portion of the cylindrical cap 106 of the choke stem 66 is disposed within the cavity 184 of the actuator stem 162 so that the portion is disposed between the axially-facing inside arcuate surface 188 and the axially-facing inside surface 194 of the actuator stem 162. Further, the axially-facing surfaces 192 and 188 of the actuator stem 162 are disposed between the annular surfaces 110 and 108 of the choke stem 66. When the actuator stem 162 is operably coupled to the choke stem 66, one or both of the tubular coupling 160 and the actuator stem 162 extends through the opening 124 of the adapter 42. Due to the operable coupling of the actuator stem 162 to the choke stem 66, the nut 158 is operably coupled to the gate 64.

Regarding the operable coupling of the linear roller screw assembly 40 to the choke body 12, as a result of the above-described operable coupling of the linear roller screw assembly 40 to the bonnet assembly 44, movement of the actuator stem 162 of the linear roller screw assembly 40 causes the gate 64 to move, relative to the seat 58 of the choke body 12, so that the gate 64 either engages the seat 58 or is positioned proximate thereto.

In operation, in several exemplary embodiments with continuing reference to FIGS. 1-16, drilling fluid or mud is circulated down through a drilling or casing string that extends within a subterranean wellbore, and up through an annular region defined between the wellbore and the drilling or casing string. As indicated by the arrow 34 in FIGS. 1, 2, and 6, the drilling fluid flows into the choke body 12 via the inlet fluid passage 24. The drilling fluid enters the internal region 47. If the gate 64 is not engaged with the seat 58, the drilling fluid flows between the gate 64 and the seat 58, and into the outlet fluid passage 30. The drilling fluid then flows out of the choke body 12 via the outlet fluid passage 30, as indicated by the arrow 36 in FIGS. 1, 2, 5, and 6.

The choke apparatus 10 operates to control the imposition of backpressure on the drilling fluid. More particularly, to reduce the backpressure on the drilling fluid, the gate 64 is moved, relative to and away from the seat 58, thereby opening or further opening the choke apparatus 10. To increase the backpressure on the drilling fluid, the gate 64 is moved, relative to and towards the seat 58, thereby closing the choke apparatus 10 or reducing the degree to which the choke apparatus 10 is open.

To move the gate 64 relative to and away from the seat 58, the motor 38 drives the gearbox 15, which drives the linear roller screw 152, causing the linear roller screw 152 to rotate. The linear roller screw 152 drives the nut 158, causing the nut 158 to move in a direction 200, which is shown in FIGS. 5 and 6. The nut 158 pulls the tubular coupling 160, causing the tubular coupling 160 to move in the direction 200. In turn, the tubular coupling 160 pulls the actuator stem 162, causing the actuator stem 162 to move in the direction 200. As a result, the actuator stem 162 pulls the choke stem 66, and thus the gate 64, away from the seat 58. In particular, the axially-facing inside arcuate surface 188 of the actuator stem 162 moves in the direction 200 and engages the annular surface 108 of the choke stem 66, causing the choke stem 66 to move in the direction 200. As a result, the choke stem 66 and the gate 64 move in the direction 200 relative to, among other components, the bonnet plate 60, the seal assembly 62, and the seat 58.

To move the gate 64 relative to and towards the seat 58, the motor 38 drives the gearbox 15, which drives the linear roller screw 152, causing the linear roller screw 152 to rotate, but in a direction opposite the direction the linear roller screw 152 rotates when the gate 64 is to be moved away from the seat 58. The linear roller screw 152 drives the nut 158, causing the nut 158 to move in a direction 202, which is shown in FIGS. 5 and 6. The nut 158 pushes the tubular coupling 160, causing the tubular coupling 160 to move in the direction 202. In turn, the tubular coupling 160 pushes the actuator stem 162, causing the actuator stem 162 to move in the direction 202. As a result, the actuator stem 162 pushes the choke stem 66, and thus the gate 64, towards the seat 58. In particular, the axially-facing inside surface 194 of the actuator stem 162 moves in the direction 202 and engages the cap 106 of the choke stem 66, and/or the recessed axially-facing surface 192 engages the annular surface 110 of the choke stem 66, causing the choke stem 66 to move in the direction 202. As a result, the choke stem 66 and the gate 64 move in the direction 202 relative to, among other components, the bonnet plate 60, the seal assembly 62, and the seat 58. The circular recess 76 is sized to receive the actuator stem 162, and in particular the cylindrical cap 166 of the actuator stem 162, so that the actuator stem 162 is permitted to travel linearly, relative to the bonnet plate 60 and without interference.

During the above-described operation, in several exemplary embodiments, the operation of the combination of at least the motor 38, the gearbox 15, and the linear roller screw assembly 40 accurately and precisely controls the position of the gate 64, relative to the seat 58, thereby more accurately controlling the imposition of backpressure on the drilling fluid. In several exemplary embodiments, the use of the motor 38, the gearbox 15, and the linear roller screw assembly 40 reduces the effect of high or low temperatures on the control of the position of the gate 64. In several exemplary embodiments, the use of the motor 38, the gearbox 15, and the linear roller screw assembly 40 reduces the amount of time needed for the choke apparatus 10 to respond to pressure fluctuations within the system through which the drilling fluid is being circulated. In several exemplary embodiments, the motor 38 is, includes, or is part of, a servo-motor having a built-in encoder, which provides data on position, velocity, one or more other parameters, or any combination thereof, thereby enabling extremely precise control.

Figure 17:
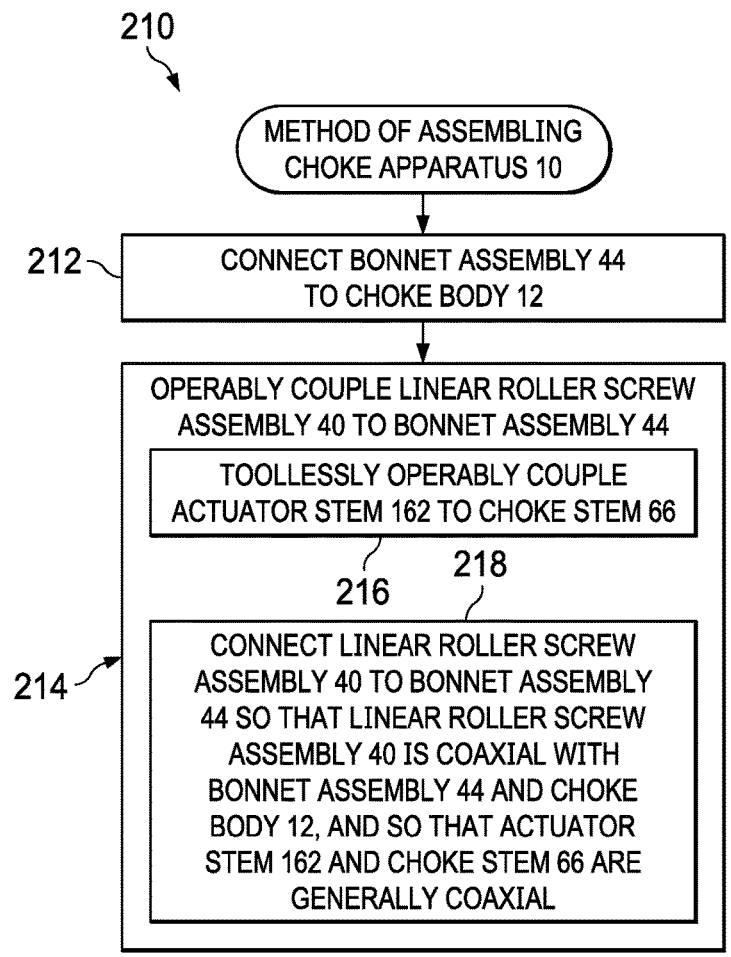
FIG. 17 is a flow chart illustration of a method of assembling the choke apparatus of FIGS. 1-6, according to an exemplary embodiment.

In an exemplary embodiment, as illustrated in FIG. 17 with continuing reference to FIGS. 1-16, a method of assembling the choke apparatus 10 is generally referred to by the reference numeral 210. The method 210 includes step 212, at which the bonnet assembly 44 is connected to the choke body 12. At the step 212, in an exemplary embodiment, the end of the nose 82 opposing the bonnet plate 60 is inserted into the internal passage 52, and the external threaded connection 88 of the nose 82 is threadably engaged with the internal threaded connection 52 of the choke body 12. As a result, the bonnet assembly 44 is connected to the choke body 12, the sealing assembly 62 extends within the internal passage 52 and the internal region 47, the end of the nose 82 opposing the bonnet plate 60 is disposed within the internal region 47, and the side surface 84 of the bonnet plate 60 abuts the end surface 54 of the pipe 48 of the choke body 12.

Before, during, or after the step 212, in an exemplary embodiment, the linear roller screw assembly 40 is operably coupled to the bonnet assembly 44 at step 214. In an exemplary embodiment, the step 214 includes operably coupling the electric actuator 14, as a whole and including the linear roller screw assembly 40, to the bonnet assembly 44 and thus also to the choke body 12.

The step 214 includes a step 216, at which the actuator stem 162 is toollessly operably coupled to the choke stem 66 by first effecting relative movement between the cap 106 of the choke stem 66 and the actuator stem 162 so that the off-center opening 178 receives the cap 106. Since the outside diameter d1 of the cap 106 is less than the inside diameter d2 of the off-center opening 178, the cap 106 is received within the off-center opening 178. At the step 214, in several exemplary embodiments, additional relative movement between the choke stem 66 and the actuator stem 162 may be effected so that a portion of the cylindrical cap 106 of the choke stem 66 is disposed within the cavity 184 of the actuator stem 162, so that the portion is disposed between the axially-facing inside arcuate surface 188 and the axially-facing inside surface 194 of the actuator stem 162, and so that the axially-facing surfaces 192 and 188 of the actuator stem 162 are disposed between the annular surfaces 110 and 108 of the choke stem 66.

During or after the step 216, at step 218 the linear roller screw assembly 40 is connected to the bonnet assembly 44 so that the linear roller screw assembly 40 is coaxial with the bonnet assembly 44, and so that the actuator stem 162 and the choke stem 66 are generally coaxial. At the step 218, the adapter 42, which is connected to the end block 144 of the linear roller screw assembly 40, is mounted against the side surface 72 of the bonnet plate 60. The fasteners 198a-d are inserted through the slotted openings 68a-d, respectively, of the bonnet plate 60, and further through the outer corner bores 140a-d, respectively, of the adapter 42. The slotted openings 68a-d allow the adapter 42 (and thus the linear roller screw assembly 40, the gearbox 15, the clutch 18, and the motor 38 connected to the adapter 42) to be rotated independently of, and relative to, the bonnet assembly 44. In several exemplary embodiments, the adapter 42's ability to rotate independently of, and relative to, the bonnet assembly 44 ensures that the center-of-gravity of the linear roller screw assembly 40 is such that it creates a clockwise torque on the bonnet assembly 44, effectively tightening the bonnet assembly 44 to the choke body 12, as opposed to leaning in a manner that could cause the bonnet assembly 44 to be loosened from the choke body 12, that is, the external threaded connection 88 disengaging, at least in part, from the internal threaded connection 52. In several exemplary embodiments, the slotted openings 68a-d allow the adapter 42 (and thus the linear roller screw assembly 40, the gearbox 15, the clutch 18, and the motor 38 connected to the adapter 42) to be rotated up to, for example, 30, 40, 45, or 75 degrees, independently of (or relative to), the bonnet assembly 44; as a result, in several exemplary embodiments, the risk of the external threaded connection 88 disengaging, at least in part, from the internal threaded connection 52, is reduced. In several exemplary embodiments, this relative rotation may be effected notwithstanding the connection between the bonnet assembly 44 and the adapter 42. That is, the connection between the bonnet assembly 44 and the adapter 42 permits the adapter 42, and thus the electric actuator 14, to rotate relative to the bonnet assembly 44; in several exemplary embodiments, the respective threaded engagements of the fasteners 198a-d may be loosened, or may not yet be fully tightened, to permit the relative rotation, but the bonnet assembly 44 remains connected to the adapter 42. At the step 216, the adapter 42 is mounted against the side surface 72 of the bonnet plate 60 so that the internal alignment shoulders 136a-d of the adapter 42 mate against the external alignment shoulders 80a-d, respectively, of the bonnet plate 60, aligning the bonnet plate 60 with the adapter 42. As a result, the adapter 42 is coaxial with the bonnet assembly 44 and the choke body 12 along the axis 57. Since the adapter 42 is connected to the linear roller screw assembly 40, the linear roller screw assembly 40 is also coaxial with the bonnet assembly 44 and the choke body 12 along the axis 57. In an exemplary embodiment, the alignment of the bonnet plate 60 with the adapter 42, which causes the adapter 42 to be coaxial with the bonnet assembly 44 along the axis 57, also causes relative movement between the cap 106 of the choke stem 66 and the actuator stem 162 so that the cap 106 is caught in the cavity 184 of the actuator 162. More particularly, the relative movement between the cap 106 and the actuator 162 causes a portion of the cylindrical cap 106 of the choke stem 66 to move within the cavity 184 of the actuator stem 162 so that the portion is disposed between the axially-facing inside arcuate surface 188 and the axially-facing inside surface 194 of the actuator stem 162. Further, the axially-facing surfaces 192 and 188 of the actuator stem 162 are disposed between the annular surfaces 110 and 108 of the choke stem 66. Once the portion of the cap 106 is disposed within the cavity 184, the actuator stem 162 and the choke stem 66 are generally coaxial along the axis 57. In several exemplary embodiments, the actuator stem 162 and the choke stem 66 become generally coaxial along the axis 57 automatically as a result of the connection of the adapter 42 to the bonnet plate 60 in accordance with the foregoing.

Before, during, or after the step 214, the gearbox 15 is operably coupled to the linear roller screw assembly 40, and the motor 38 is operably coupled to the gearbox 15, in accordance with the foregoing description of the choke apparatus 10. In an exemplary embodiment, if the step 214 is completed after the gearbox 15 has been operably coupled to the linear screw assembly 40, as well as after the motor 38 has been operably coupled to the gearbox 15 (to which the clutch 18 is operably coupled), then the choke apparatus 10 is formed upon the completion of the step 214. In an exemplary embodiment, if the step 214 includes operably coupling the electric actuator 14, as a whole and including the linear roller screw assembly 40, to the bonnet assembly 44 and thus also to the choke body 12, then the choke apparatus 10 is formed upon completion of the step 214.

Figure 18:
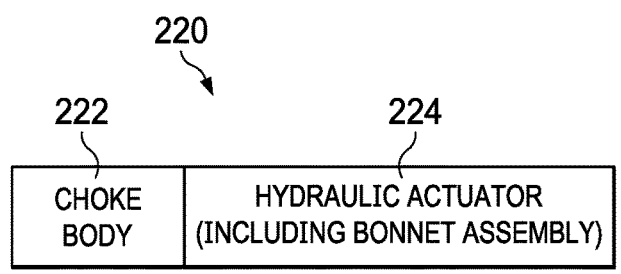
FIG. 18 is a diagrammatic illustration of a choke apparatus that includes a choke body, according to an exemplary embodiment.

In an exemplary embodiment, as illustrated in FIG. 18 with continuing reference to FIGS. 1-17, a hydraulic choke apparatus is generally referred to by the reference numeral 220 and includes a choke body 222 and a hydraulic actuator 224 connected thereto. In an exemplary embodiment, the choke body 222 is identical to the choke body 12 of the choke apparatus 10. The hydraulic actuator 224 includes a bonnet assembly that is connected to the choke body 222; in an exemplary embodiment, the bonnet assembly is integrally formed with the hydraulic actuator 224.

Figure 19:
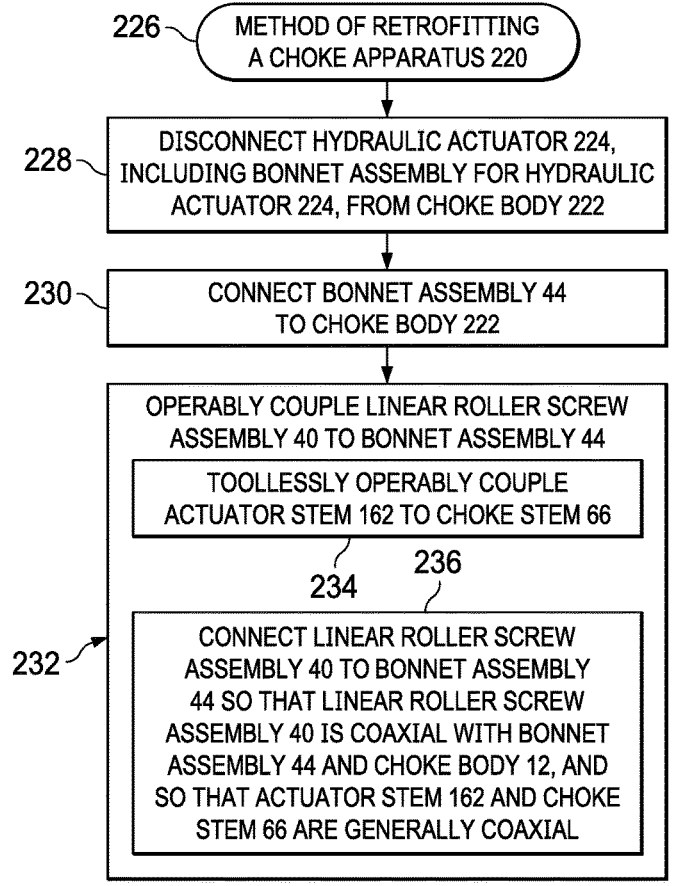
FIG. 19 is a flow chart illustration of a method of retrofitting the choke apparatus of FIG. 18, according to an exemplary embodiment.
Figure 20:
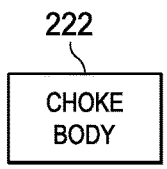
FIGS. 20-22 are diagrammatic illustrations of at least the choke body of FIG. 18 during respective steps of the method of FIG. 19, according to an exemplary embodiment.
Figure 21:
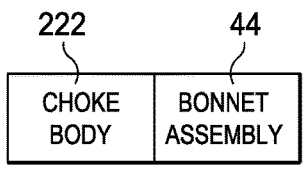
Figure 22:
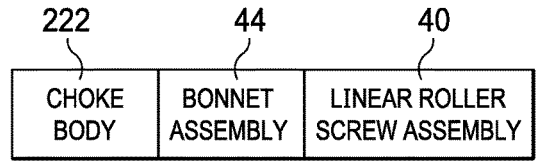

In an exemplary embodiment, as illustrated in FIGS. 19-22 with continuing reference to FIGS. 1-18, a method of retrofitting the hydraulic choke apparatus 220 is generally referred to by the reference numeral 226. As shown in FIGS. 19 and 20, the method 226 includes a step 228, at which the hydraulic actuator 224, including the bonnet assembly for the hydraulic actuator 224, is disconnected from the choke body 222. As shown in FIGS. 19 and 21, after the step 228, at step 230 the bonnet assembly 44 is connected to the choke body 222 in a manner identical to the above-described manner in which the bonnet assembly 44 is connected to the choke body 12. As shown in FIGS. 19 and 22, before, during, or after the step 230, at step 232 the linear roller screw assembly 40 is operably coupled to the bonnet assembly 44. In an exemplary embodiment, the step 232 includes operably coupling the electric actuator 14, as a whole and including the linear roller screw assembly 40, to the bonnet assembly 44 and thus also to the choke body 12.

The step 232 includes steps 234 and 236. The steps 234 and 236 are identical the above-described steps 216 and 218, respectively, of the method 210. Therefore, the steps 234 and 236 will not be described in further detail.

Before, during, or after the step 232, the gearbox 15 is operably coupled to the linear roller screw assembly 40, and the motor 38 is operably coupled to the gearbox 15, in accordance with the foregoing description of the choke apparatus 10. In an exemplary embodiment, if the step 232 is completed after the gearbox 15 has been operably coupled to the linear screw assembly 40, as well as after the motor 38 has been operably coupled to the gearbox 15 (to which the clutch 18 is operably coupled), then a choke apparatus substantially identical to the choke apparatus 10 is formed upon the completion of the step 232; thus, the execution of the method 226 results in the retrofitting of the hydraulic choke apparatus 220 to form a choke apparatus that is substantially identical to the choke apparatus 10. In an exemplary embodiment, if the step 232 includes operably coupling the electric actuator 14, as a whole and including the linear roller screw assembly 40, to the bonnet assembly 44 and thus also to the choke body 12, then the completion of the step 232 results in a choke apparatus that is substantially identical to the choke apparatus 10.

In several exemplary embodiments, as noted above, the nose 82 of the bonnet assembly 44 is compatible with any Cameron® style drilling choke; thus, any Cameron® style drilling choke may be retrofitted in accordance with the method 226. In several exemplary embodiments, the nose 82 of the bonnet assembly 44 is compatible with any Cameron® style hydraulic drilling choke; thus, any Cameron® style hydraulic drilling choke may be retrofitted in accordance with the method 226. In several exemplary embodiments, the nose 82 of the bonnet assembly 44 is compatible with one or more different styles of drilling chokes; thus, the one or more different styles of drilling chokes may be retrofitted in accordance with the method 226.

Figure 23:
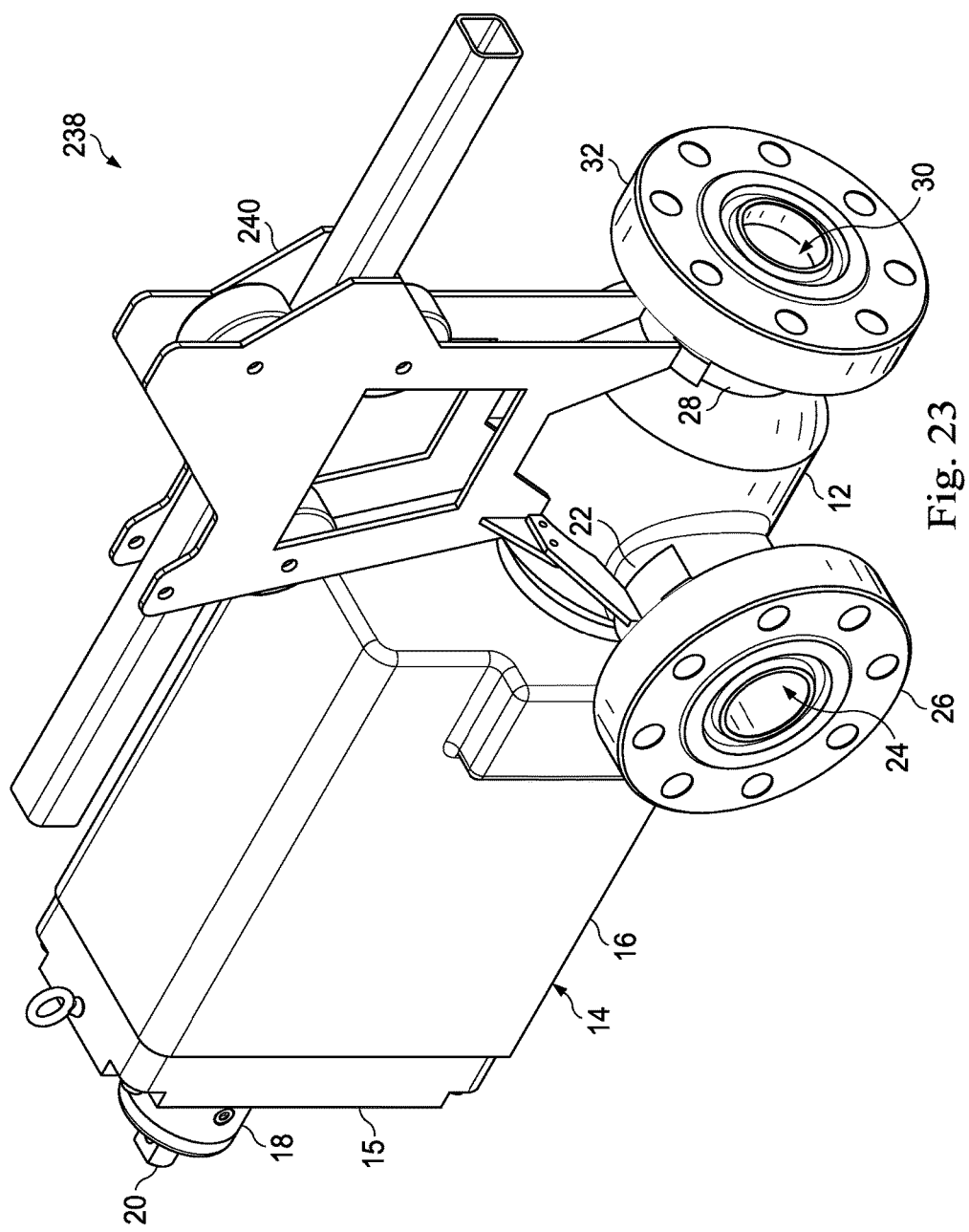
FIG. 23 is a perspective view of a choke apparatus, according to another exemplary embodiment.

In an exemplary embodiment, as illustrated in FIG. 23 with continuing reference to FIGS. 1-22, a choke apparatus is generally referred to by the reference numeral 238 and includes all of the components of the choke apparatus 10, which identical components are given the same reference numerals. The operation of the choke apparatus 238 is identical to the above-described operation of the choke apparatus 10. As shown in FIG. 23, the choke apparatus 238 further includes a gantry 240, which is connected to the choke body 12. In an exemplary embodiment, the case 16 is integrated with the gantry 240 so that the electric actuator 14 may be disconnected from the bonnet assembly 44 and moved out of the way to permit maintenance activities to be conducted on the choke body 12, without the need for a forklift or other lifting apparatus or system. In an exemplary embodiment, the gantry 240 permits the electric actuator 14 to swing out of the way of the choke body 12 so that maintenance on the choke body 12 can take place without interference from the electric actuator 14.

In an exemplary embodiment, the gantry 240 permits relative movement, in the vertical direction (perpendicular to each of the directions 200 and 202), between the choke body 12 and the electric actuator 14. In an exemplary embodiment, the gantry 240 permits height adjustment of the choke body 12. In an exemplary embodiment, the height of the choke body 12, relative to the ground or other horizontal surface, may be adjusted using the gantry 240. This height adjustment facilitates the toolless operable coupling between the actuator stem 162 and the choke stem 66, which operably couples the linear roller screw assembly 40 to the bonnet assembly 44. Exemplary embodiments of this toolless operable coupling are illustrated in FIGS. 5, 6, and 16. Adjusting, using the gantry 240, the height of the choke body 12 facilities the reception of the cap 106 within the off-center opening 178, the disposal of a portion of the cylindrical cap 106 of the choke stem 66 within the cavity 184 of the actuator stem 162 so that the portion is disposed between the axially-facing inside arcuate surface 188 and the axially-facing inside surface 194 of the actuator stem 162, and the disposal of the axially-facing surfaces 192 and 188 of the actuator stem 162 between the annular surfaces 110 and 108 of the choke stem 66.

Figure 24:
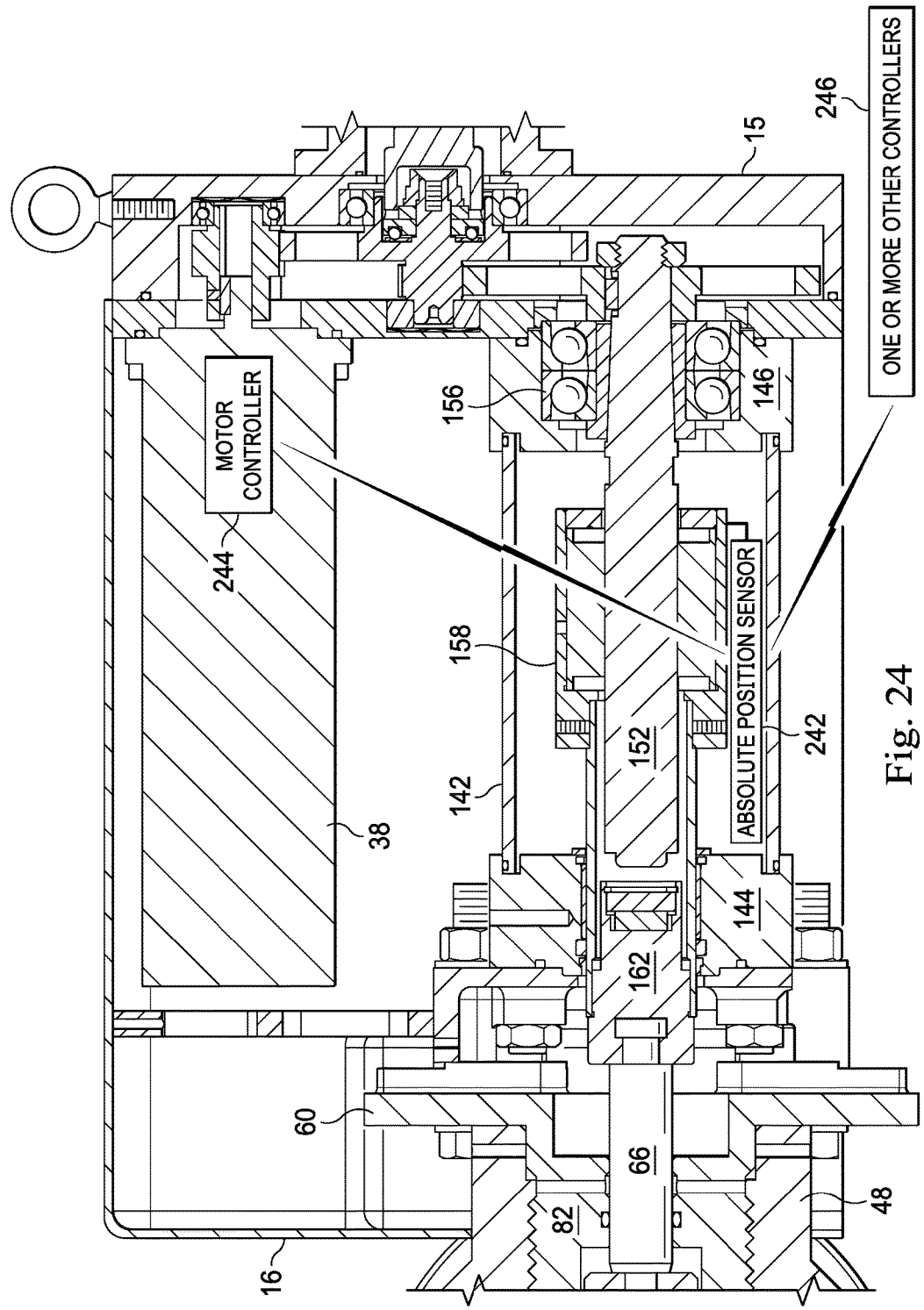
FIG. 24 is an enlarged view of a portion of FIG. 5 but depicting additional components of the choke apparatus of FIGS. 1-6, according to an exemplary embodiment.

In an exemplary embodiment, as illustrated in FIG. 24 with continuing reference to FIGS. 1-23, the choke apparatus 10 includes an absolute position sensor 242, which is disposed in the tubular housing 142 and operably coupled to the nut 158. In an exemplary embodiment, the absolute position sensor 242 is in communication with a motor controller 244 of the motor 38. In an exemplary embodiment, instead of, or in addition to the motor controller 244, the absolute position sensor 242 is in communication with the one or more other controllers 246, which may be located within the case 16, proximate the case 16, remotely from the case 16, or any combination thereof. In an exemplary embodiment, the absolute position sensor 242 is, includes, or is part of, a model TA12 linear transducer, which is commercially available from Balluff Inc., Florence, Ky. USA. In an exemplary embodiment, the absolute position sensor 242 is, includes, or is part of, a model LK transducer, which is commercially available from Rota Engineering Ltd, Manchester, United Kingdom.

In operation, in an exemplary embodiment, the absolute position sensor 242 detects the location of the nut 158 within the tubular housing 142. Since as discussed above the nut 158 is operably coupled to, and translates along with, the gate 64, the absolute position sensor 242 indirectly detects the position of the gate 64, and thus detects the degree to which the drilling choke 10 is open or closed, by detecting the position of the nut 158. In an exemplary embodiment, the absolute position sensor 242 communicates with the motor controller 244 and/or the one or more other controllers 246, transmitting output corresponding to the position of the nut 158 and thus related to the position of the gate 64. In an exemplary embodiment, the output transmitted by the absolute position sensor 242 includes one or more electrical current signals or output; in an exemplary embodiment, the electrical current output of the absolute position sensor 242 is related to the position of the gate 64 and thus the position of the choke apparatus 10 (fully open, partially open/closed, or fully closed).

In several exemplary embodiments, the motor controller 244 and/or the one or more other controllers 246 automatically control the movement of the gate 64 in accordance with the foregoing based on, at least in part, the output transmitted by the absolute position sensor 242. In several exemplary embodiments, in addition to the output transmitted by the absolute position sensor 242, the motor controller 244 and/or the one or more other controllers 246 automatically control the movement of the gate 64 based on other parameters such as, for example, pressure measurements upstream and/or downstream of the choke apparatus 10, the flow rate of the drilling fluid flowing towards the choke apparatus 10, one or more parameters measured or detected by a built-in encoder of the motor 38 (such as, for example, position, velocity, one or more other parameters, or any combination thereof), or any combination thereof.

In operation, in an exemplary embodiment, if an electrical power failure occurs during the above-described operation of the choke apparatus 10 and thus at least the motor 38 is de-energized, the absolute position sensor 242 allows the choke apparatus 10 to resume operation after electrical power is restored, but without having to recalibrate the position of the nut 158 and thus the gate 64. That is, upon start up after electrical power is restored, the absolute position sensor 242 does not need to undergo a homing sequence to reset the position of the nut 158; such a homing sequence may involve moving the gate 64 to a fully closed position and/or to a fully open position. Instead, after electrical power is restored to the choke apparatus 10, the absolute position sensor 242 communicates the absolute position of the nut 158 and thus the gate 64, eliminating the need for such a homing sequence and/or any other position calibration procedure.

Figure 25:
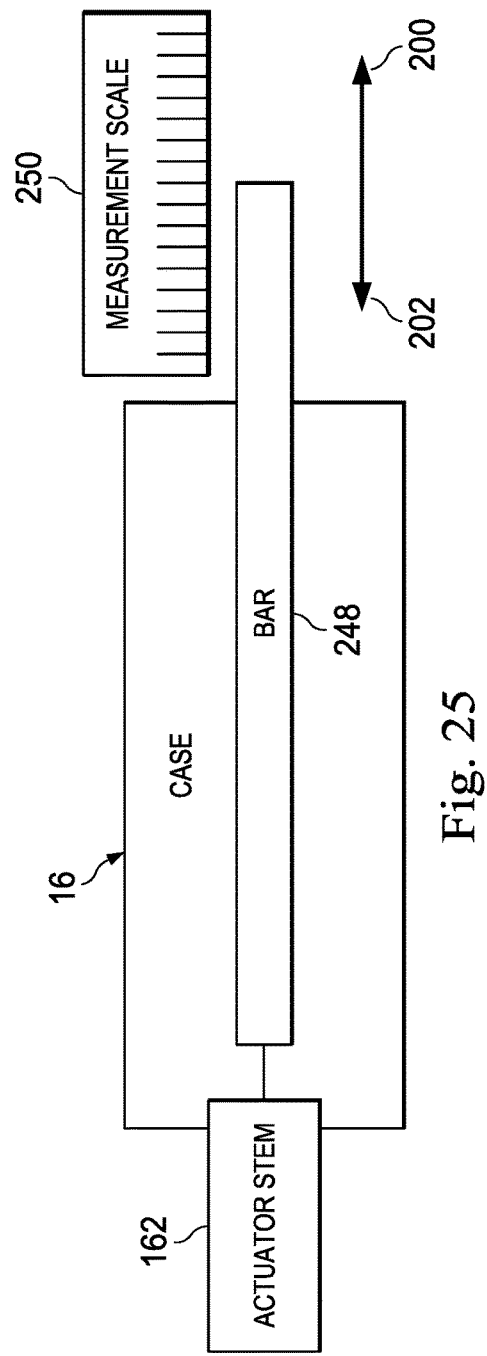
FIG. 25 is a diagrammatic illustration of a subset of components of the choke apparatus of FIGS. 1-6, according to an exemplary embodiment.

In an exemplary embodiment, as illustrated in FIG. 25 with continuing reference to FIGS. 1-24, the choke apparatus 10 includes a bar 248, which is connected to the actuator stem 162 and extends out of the case 16. A measurement scale 250 is mounted to, or is at least proximate, the case 16 at the location where the bar 248 extends out of the case 16. In operation, in an exemplary embodiment, the bar 248 moves along with the actuator stem 162 in the direction 200 or 202 during the above-described operation of the choke apparatus 10. Before, during, and after this movement of the bar 248, the position of the bar 248, relative to the measurement scale 250 (which is stationary), indicates the position of the actuator stem 162 and thus the position of the gate 64. The position of the bar 248, relative to the measurement scale 250, indicates the position of the actuator stem 162 and thus the gate 64 operably coupled thereto, regardless of whether electrical power is being supplied to the choke apparatus 10. Thus, in several exemplary embodiments, the bar 248 provides a physical indicator that shows the choke position of the choke apparatus 10, regardless of whether the choke apparatus 10 has electrical power. As a result, a visual inspection of the choke apparatus 10 indicates the actual choke position, that is, the degree to which the choke apparatus 10 is open or closed (the position of the gate 64 relative to the seat 58).

Figure 26:
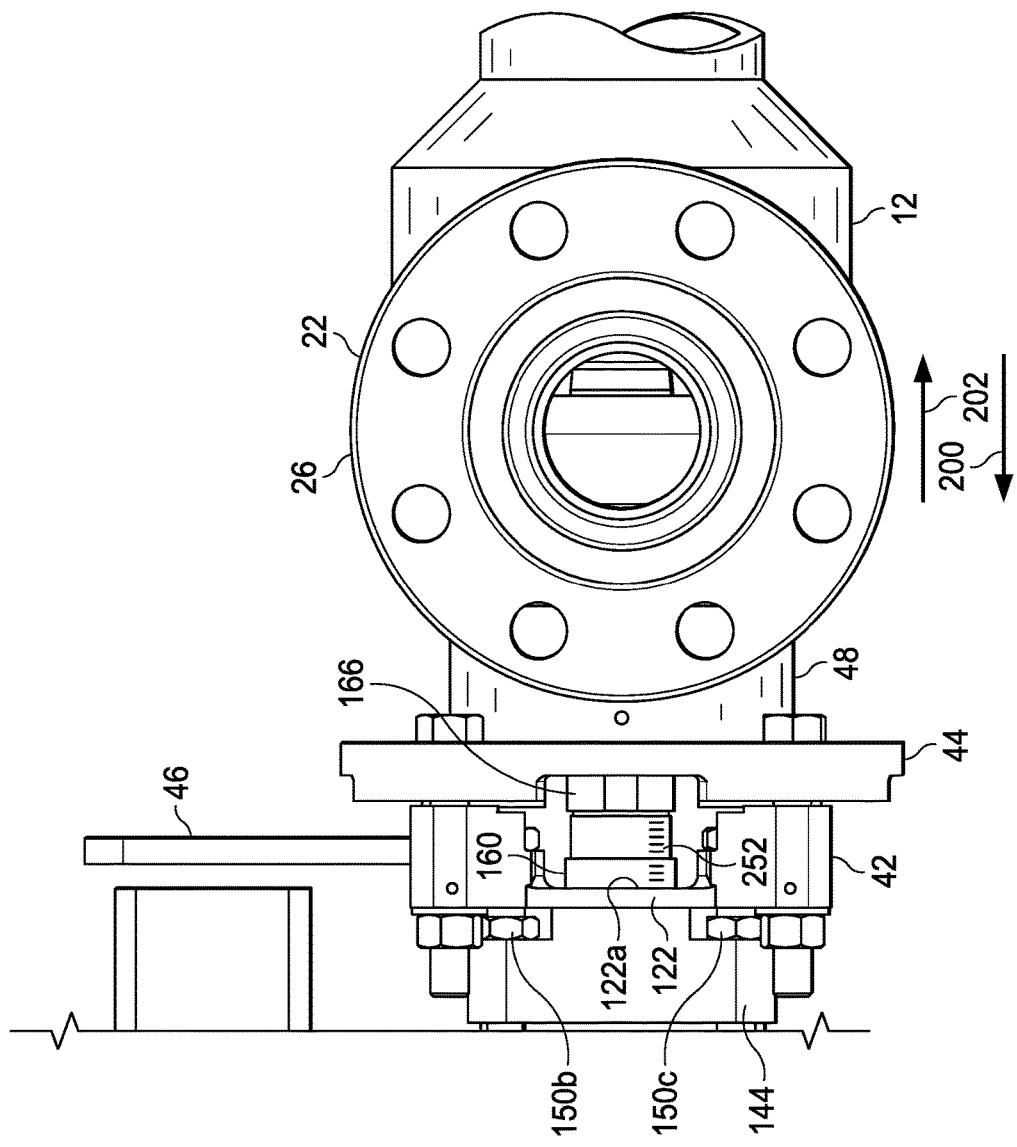
FIG. 26 is an enlarged view of a portion of FIG. 4, according to an exemplary embodiment.

In an exemplary embodiment, as illustrated in FIG. 26 with continuing reference to FIGS. 1-25, the choke apparatus 10 includes a measurement scale 252, which is formed in, or connected to, an end portion of the tubular coupling 160 that is adjacent the cylindrical cap 166 of the actuator stem 162. As shown in FIG. 26, in an exemplary embodiment, the measurement scale 252 is also formed in, or connected to, the cylindrical cap 166 so that the measurement scale 252 is contiguous between the tubular coupling 160 and the cylindrical cap 166 of the actuator stem 162. In an exemplary embodiment, the measurement scale 252 is neither formed in, nor connected to, the cylindrical cap 166.

In operation, in an exemplary embodiment, the actuator stem 162 moves in the direction 200 or 202 during the above-described operation of the choke apparatus 10. Before, during, and after this movement of the actuator stem 162, the position of the measurement scale 252 (and thus each of the tubular coupling 160 and the cylindrical cap 166), relative to the surface 122a of the plate 122 of the adapter 42, indicates the position of the actuator stem 162 and thus the position of the gate 64. The position of the measurement scale 252, relative to the surface 122a of the plate 122 of the adapter 42, indicates the position of the actuator stem 162 and thus the gate 64 operably coupled thereto, regardless of whether electrical power is being supplied to the choke apparatus 10. Thus, in several exemplary embodiments, the position of the measurement scale 252 relative to the surface 122a of the plate 122 provides a physical indicator that shows the choke position of the choke apparatus 10, regardless of whether the choke apparatus 10 has electrical power. As a result, a visual inspection of the choke apparatus 10 indicates the actual choke position, that is, the degree to which the choke apparatus 10 is open or closed (the position of the gate 64 relative to the seat 58). In several exemplary embodiments, a cut-out or window is formed in the case 16 to facilitate visual inspection of the position of the measurement scale 252 relative to the surface 122a of the plate 122. In several exemplary embodiments, the case 16 does not vertically extend over the actuator stem 162 and at least a portion of the plate 122 to thereby facilitate visual inspection of the position of the measurement scale 252 relative to the surface 122a of the plate 122.

In an exemplary embodiment, the measurement scale 252 includes a "fully closed" marking connected to, or formed in, the tubular coupling 160; when this "fully closed" marking is aligned, or nearly aligned, with the surface 122a, the gate 64 contacts the seat 58 so that the choke apparatus 10 is closed and fluid is prevented from flowing therethrough. In an exemplary embodiment, the measurement scale 252 includes a "fully open" marking connected to, or formed in, either the tubular coupling 160 or the cylindrical cap 166; when this "fully opened" marking is aligned, or nearly aligned, with the surface 122a, the gate 64 is spaced from the seat 58 so that the choke apparatus 10 is fully open and fluid is permitted to flow therethrough. In an exemplary embodiment, the measurement scale 252 includes a plurality of markings disposed between a "fully closed" marking connected to, or formed in, the tubular coupling 160 and a "fully open" marking connected to, or formed in, either the tubular coupling 160 or the cylindrical cap 166; when any one of the markings in this plurality of markings is aligned, or nearly aligned, with the surface 122a, the gate 64 is positioned relative to the seat 58 so that the choke apparatus 10 is partially open/closed and fluid is permitted to flow therethrough.

Figure 27:
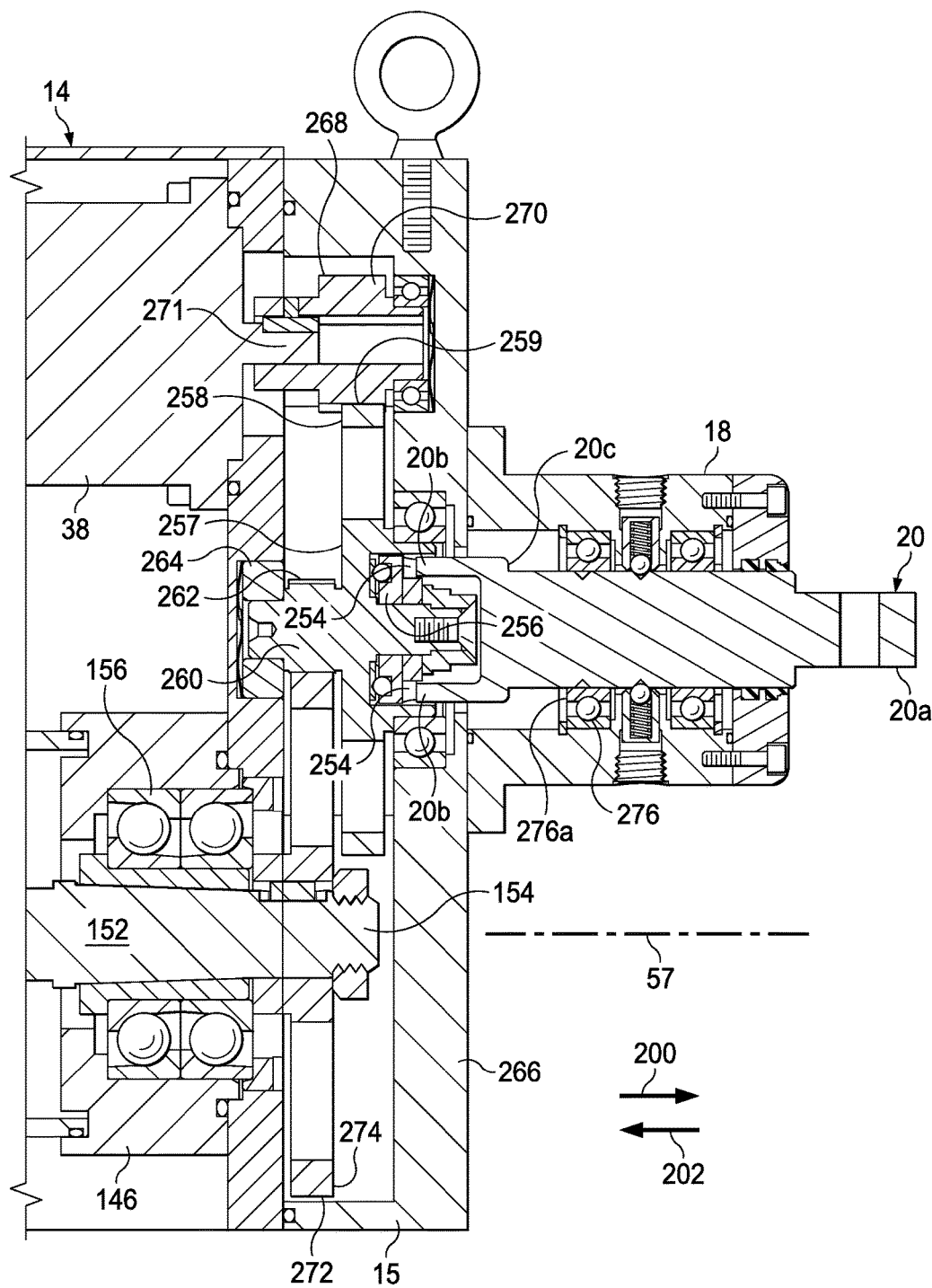
FIG. 27 is an enlarged view of a portion of FIG. 5, according to an exemplary embodiment.

In an exemplary embodiment, as illustrated in FIG. 27 with continuing reference to FIGS. 1-6, the stem 20 includes an exterior end portion 20a, to which a handwheel may be connected. The stem 20 further includes a plurality of circumferentially-spaced teeth 20b, which are formed in the end portion of the stem 20 opposing the exterior end portion 20a. The teeth 20b are adapted to engage corresponding togs 254, which are part of a mechanical torque limiter assembly 256 of the clutch 18. When the teeth 20b are so engaged, the stem 20 is operably coupled to the clutch 18. In an exemplary embodiment, the mechanical torque limiter assembly 256 is a ball detent torque limiter. The gearbox 15 includes a gear component 257, which is connected to the mechanical torque limiter assembly 256 and includes a disk 258 having gear teeth 259 disposed thereabout. A reduced-diameter portion 260 extends from the center of the disk 258 on the side opposing the mechanical torque limiter assembly 256. Gear teeth 262 are disposed about the reduced-diameter portion 260. A bearing 264 rotatably supports the distal end of the reduced-diameter portion 260. The bearing 264 is mounted in a case 266 of the gearbox 15. The teeth 259 of the gear component 257 mate with gear teeth 268 of a gear component 270, which is connected to an output shaft 271 of the motor 38. The gear teeth 262 of the gear component 257 mate with teeth 272 of a gear component 274, which is connected to the end portion 154 of the linear roller screw 152. In an exemplary embodiment, during the above-described operation of the choke apparatus 10, the motor 38 drives the gear component 270, which drives the gear component 257, which drives the gear component 274, which drives the linear roller screw 152.

With continuing reference to FIGS. 1-6 and 27, the clutch 18 provides for manual override in that the gearbox 15 may be manually driven using the stem 20 when the motor 38 is not energized. In particular, when the stem 20 is pushed in, translating in a direction towards the gearbox 15, that is, the direction 202 shown in FIGS. 5 and 27, the stem 20 moves to a pushed-in position, and the manual override is engaged. The teeth 20b engage the togs 254, each of the teeth 20b being positioned between two of the togs 254 so that torque may be transmitted from the stem 20 to the gear component 257. As the stem 20 is driven, being rotated in place so that torque is applied thereto, the mechanical torque limiter assembly 256 of the clutch 18 transmits the applied torque to the gear component 257. Due to the mating between the gear teeth 262 and the gear teeth 272, the driving of the gear component 257 drives the gear component 274, which drives the linear roller screw 152. Therefore, when the stem 20 is in the pushed-in position shown in FIGS. 5 and 27, the stem 20 is operably coupled to the clutch 18, and is permitted to drive the gearbox 15 to cause the gate 64 to move, thereby providing manual override.

In an exemplary embodiment, when the stem 20 is in the pushed-in position and thus the stem 20 is operably coupled to the clutch 18 and permitted to drive the gearbox 15 to cause the gate 64 to move, and when the torque applied to the sliding stem 20 reaches a predetermined maximum value, the clutch 18 slips so that the sliding stem 20 can no longer drive the gearbox 15. As a result, the stem 20 is not permitted to drive the gearbox 15 and damage to the gearbox 15 is prevented. In an exemplary embodiment, the clutch 18 so slips as a result of the operation of the mechanical torque limiter assembly 256, which slips so that the torque applied to the sliding stem 20 can no longer be transmitted from the stem 20 to the gear component 257.

Figure 28:
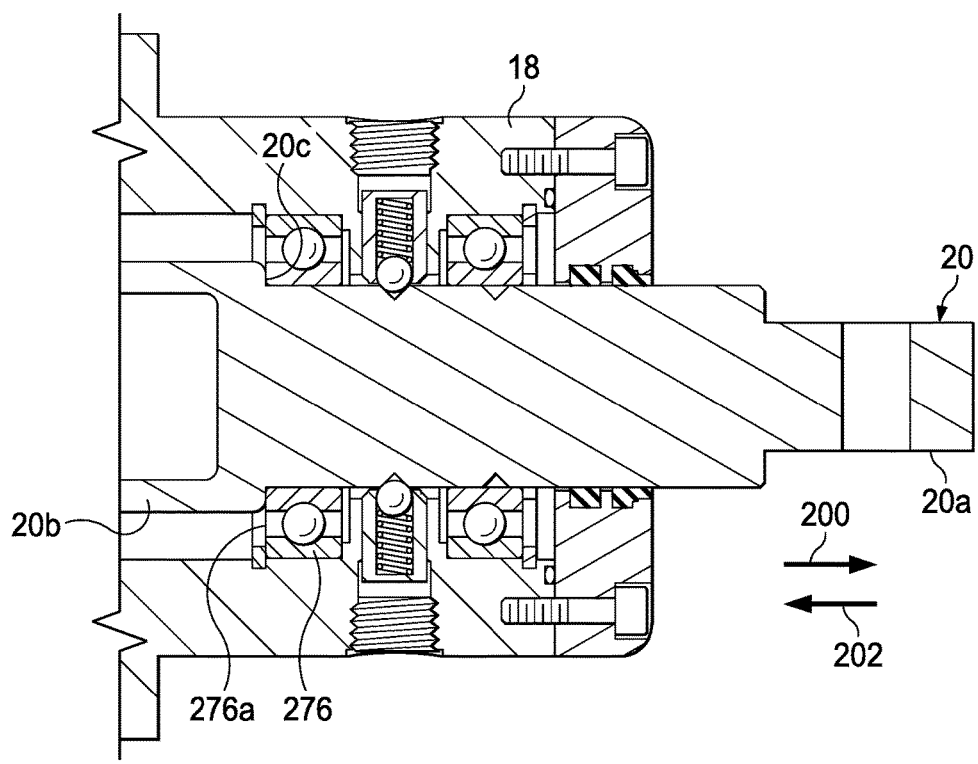
FIG. 28 is an enlarged view of a portion of FIG. 27, according to an exemplary embodiment.

In an exemplary embodiment, as illustrated in FIG. 28 with continuing reference to FIGS. 1-6 and 27, to disengage manual override, the sliding stem 20 is placed in a pulled-out position shown in FIG. 28, in which the sliding stem 20 is operably decoupled from the clutch 18 and is not permitted to drive the gearbox 15 to cause the gate 64 to move. In particular, when the stem 20 is pulled out, translating in a direction away from the gearbox 15, that is, the direction 200 shown in FIGS. 5, 27, and 28, the stem 20 moves to the pulled-out position and the manual override is disengaged. When the manual override is disengaged, the stem 20 is operably decoupled from the clutch 18, with the teeth 20b not engaging the togs 254 and thus with each of the teeth 20b not being positioned between two of the togs 254; as a result, torque is not permitted to be transmitted from the stem 20 to the gear component 257. The stem 20 can be moved in the direction 200 until an external shoulder 20c of the stem 20 contacts an axial end 276a of a bearing assembly 276 of the clutch 18; this contact is shown in FIG. 28. The stem 20 extends through the bearing assembly 276, which supports the stem 20. When the stem 20 is operably coupled to the clutch 18, the external shoulder 20c is axially spaced from the axial end 276a in the direction 202, as shown in FIG. 27.

In several exemplary embodiments, so long as the motor 38 is energized, the motor 38 is able to cause the gearbox 15 to drive the linear roller screw 152 and thus translate the gate 64, in accordance with the above-described operation of the choke apparatus 10, regardless of whether the sliding stem 20 is in the pushed-in position shown in FIGS. 5 and 27.

In an exemplary embodiment, the motor 38 is an electric motor that includes a mechanical brake, which prevents any back driving of the motor 38 during, for example, loss of electrical power or another example of de-energization of the motor 38. In several exemplary embodiments, the handwheel connected to the stem 20, the torque limiter assembly 256, and the gearing of the manual override are configured so that the torque exerted by the mechanical brake can be overridden manually using the handwheel.

In an exemplary embodiment, the stem 20 is not a sliding stem; instead, the stem is translated in a different manner; for example, the stem 20 may be, or include, a linear roller screw that is adapted to cause the teeth 20b to move towards and engage the togs 254, and to move away from and disengage from the togs 254.

In several exemplary embodiments, a plurality of instructions stored on a non-transitory computer readable medium may be executed by one or more processors to cause the one or more processors to carry out or implement in whole or in part the above-described operation of each of the above-described exemplary embodiments of the choke apparatus 10, the choke body 222 after being retrofitted with the electric actuator 14, the choke apparatus 238, or any combination thereof, as well as to carry out or implement in whole or in part the above-described execution of each of the above-described exemplary embodiments of the method 210, the method 226, or any combination thereof. In several exemplary embodiments, such processor(s) may include any processor(s) that are part of the components of the choke apparatus 10, the choke body 222 after being retrofitted with the electric actuator 14, the choke apparatus 238, or any combination thereof, and such a non-transitory computer readable medium may be distributed among one or more components of the choke apparatus 10, the choke body 222 after being retrofitted with the electric actuator 14, the choke apparatus 238, or any combination thereof. In several exemplary embodiments, such processor(s) may be part of the motor 38, the motor controller 244, the one or more controllers 246, the absolute position sensor 242, or any combination thereof. In several exemplary embodiments, such processor(s) may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

In an exemplary embodiment, as illustrated in FIGS. 29-34 with continuing reference to FIGS. 1-28, a choke apparatus is generally referred to by the reference numeral 278. The choke apparatus 278 includes several parts that are identical to corresponding parts of the choke apparatus 10, which identical parts are given the same reference numerals. The operation of the choke apparatus 278 is identical to the above-described operation of the choke apparatus 10. In several exemplary embodiments, a handwheel 279 is connected to the exterior portion 20a of the sliding stem 20 to manually drive the gearbox 15 when the motor 38 is not energized.

Figure 29:
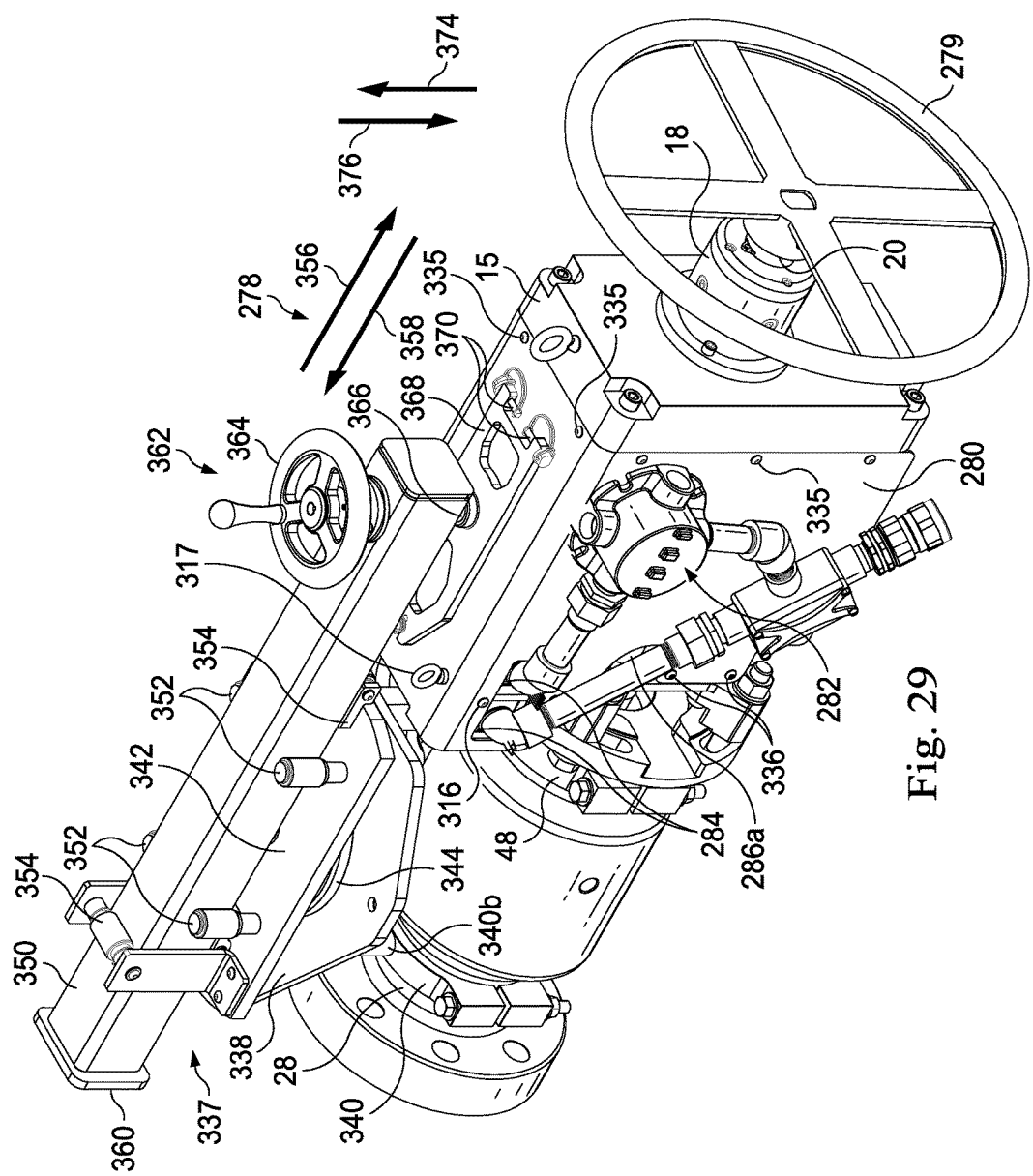
FIG. 29 is a perspective view of a choke apparatus, according to yet another exemplary embodiment.
Figure 30:
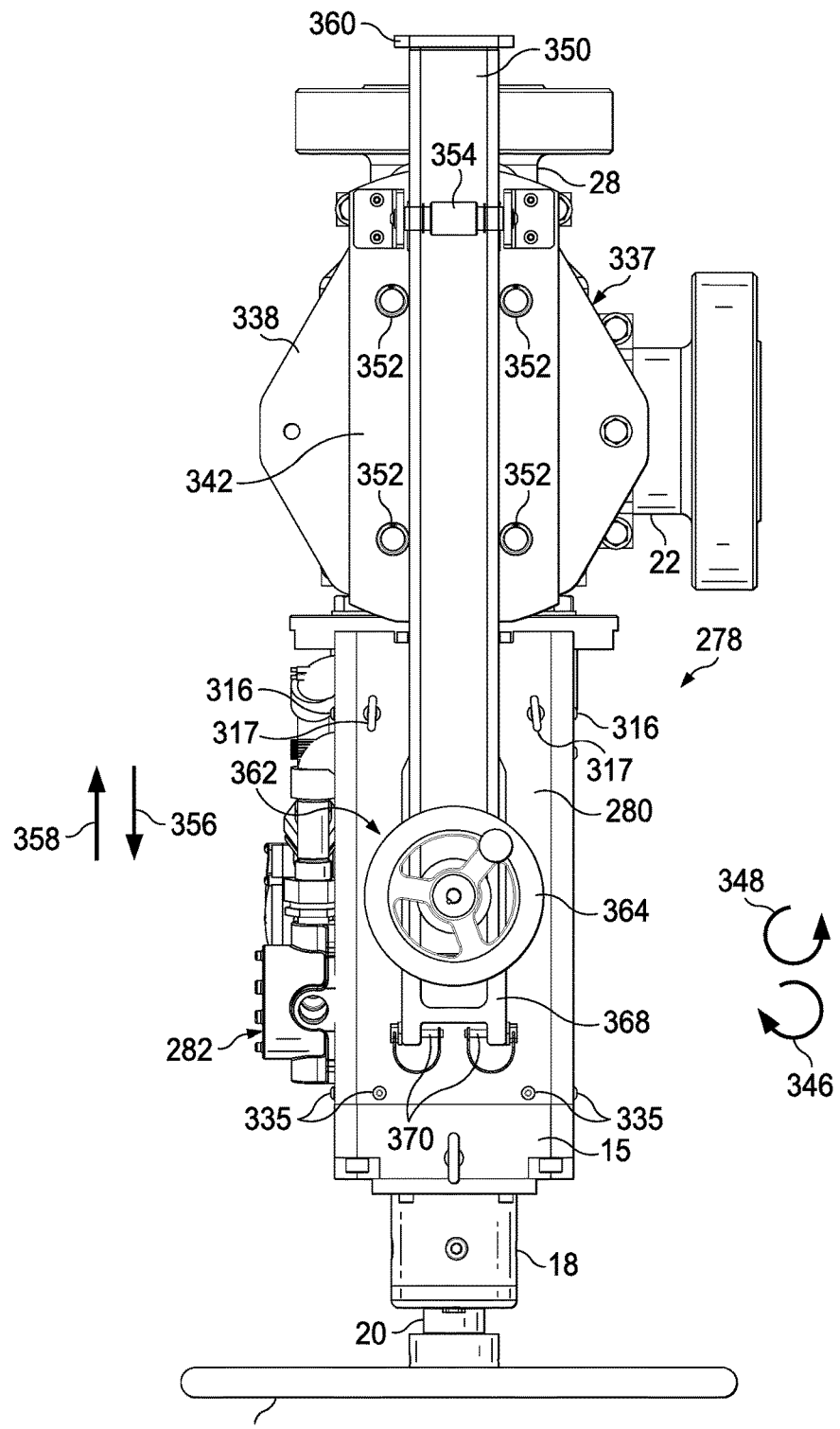
FIG. 30 is a top view of the choke apparatus of FIG. 29, according to an exemplary embodiment.
Figure 31:
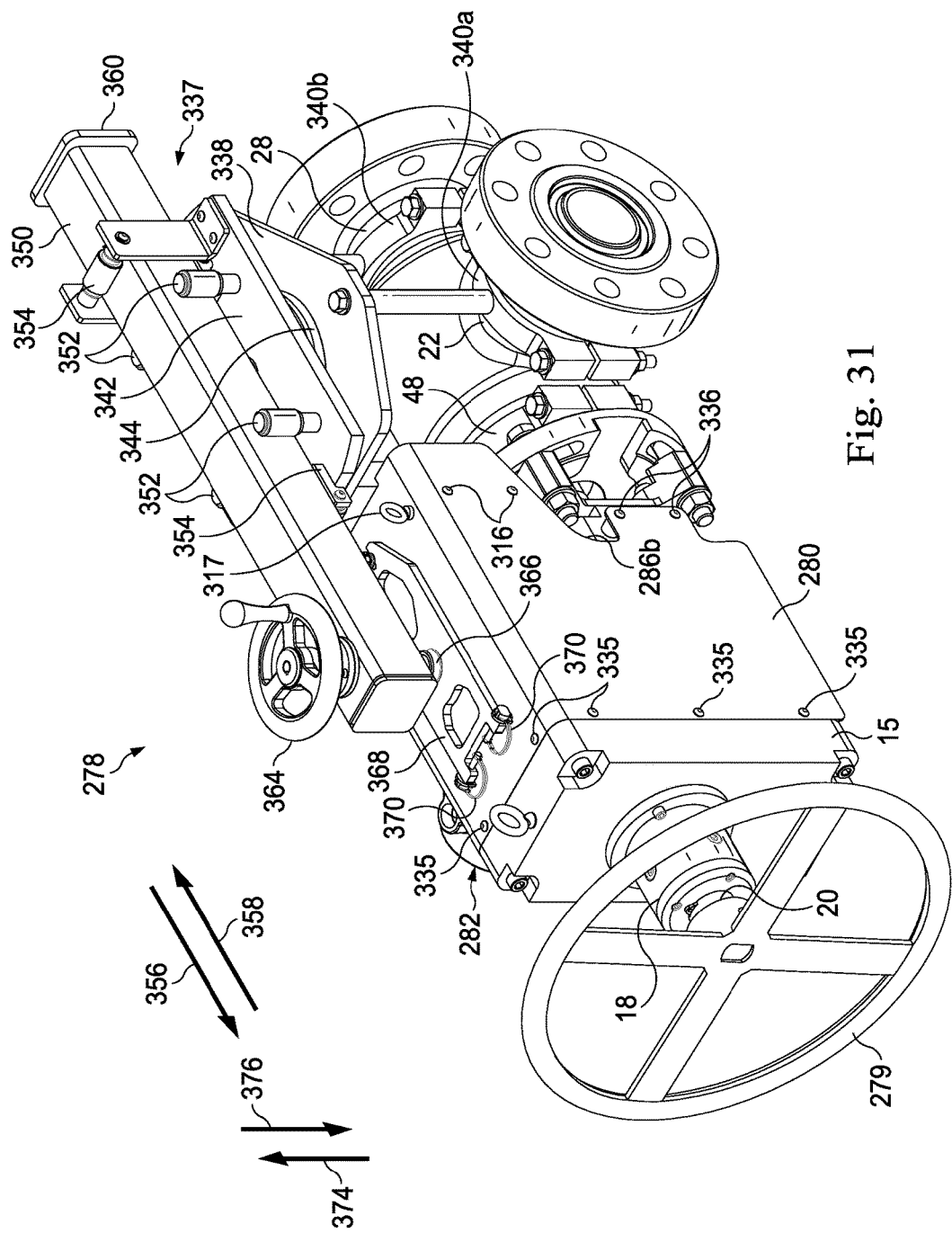
FIG. 31 is another perspective view of the choke apparatus of FIGS. 29 and 30, according to an exemplary embodiment.

In several exemplary embodiments, the choke apparatus includes a case 280, rather than the case 16. Referring to FIG. 29, an exemplary embodiment of the case 280 is illustrated. The case 280 extends between the choke body 12 and the gearbox 15. An electrical conduit assembly 282 is mounted to the case 280 and includes, for example, electrical conduit(s) and one or more explosion proof conduit boxes operably coupled to various signal and control wires associated with one or more components of the choke apparatus 278. The components of the choke apparatus 278 with which the various signal and control wires are associated may include, but are not limited to, the motor 38, the mechanical brake, the motor controller 244, the one or more other controllers 246, another component(s) of the choke apparatus 278, and/or any combination thereof.

Figure 32:
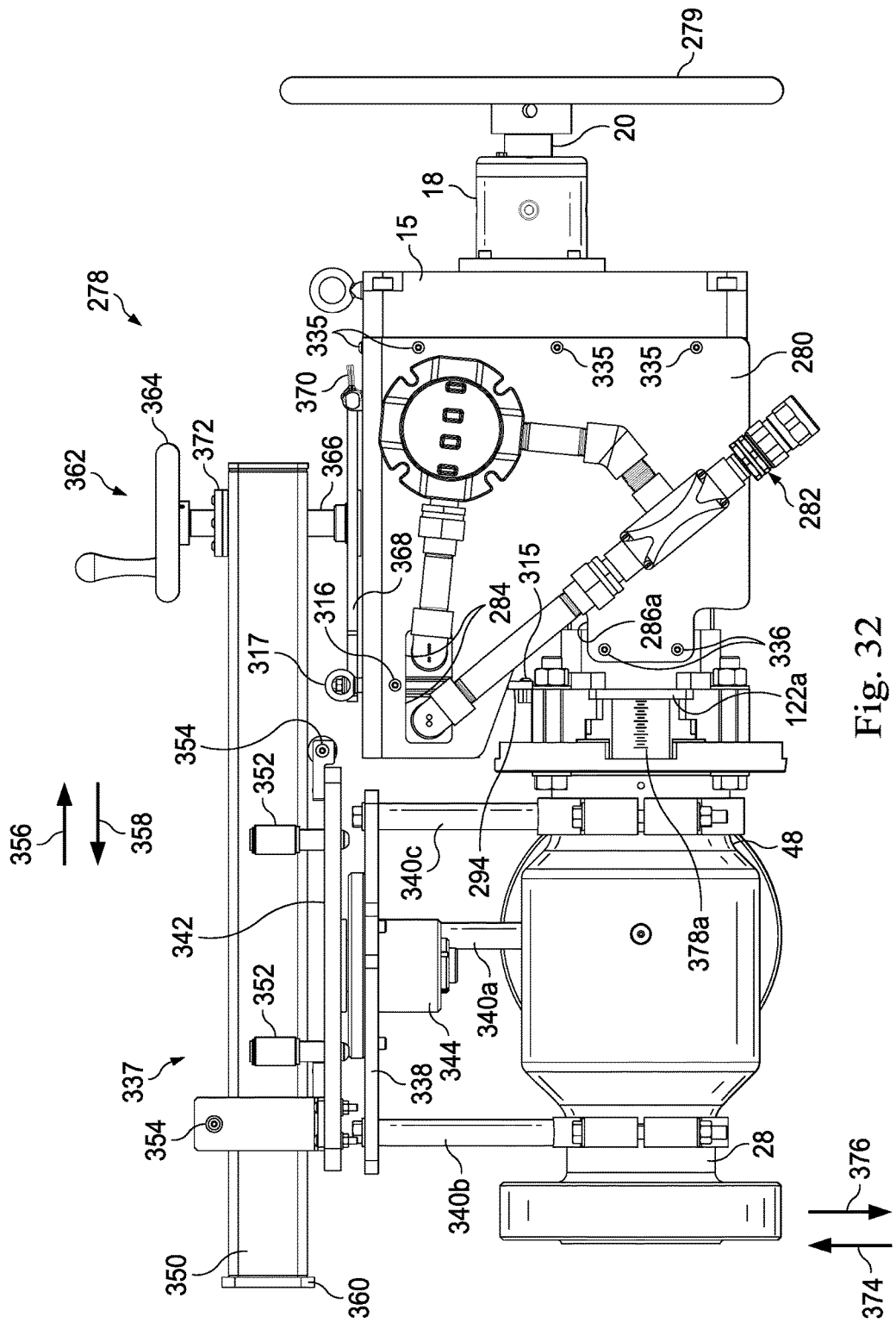
FIG. 32 is an elevational view of the choke apparatus of FIGS. 29-31, according to an exemplary embodiment.
Figure 33:
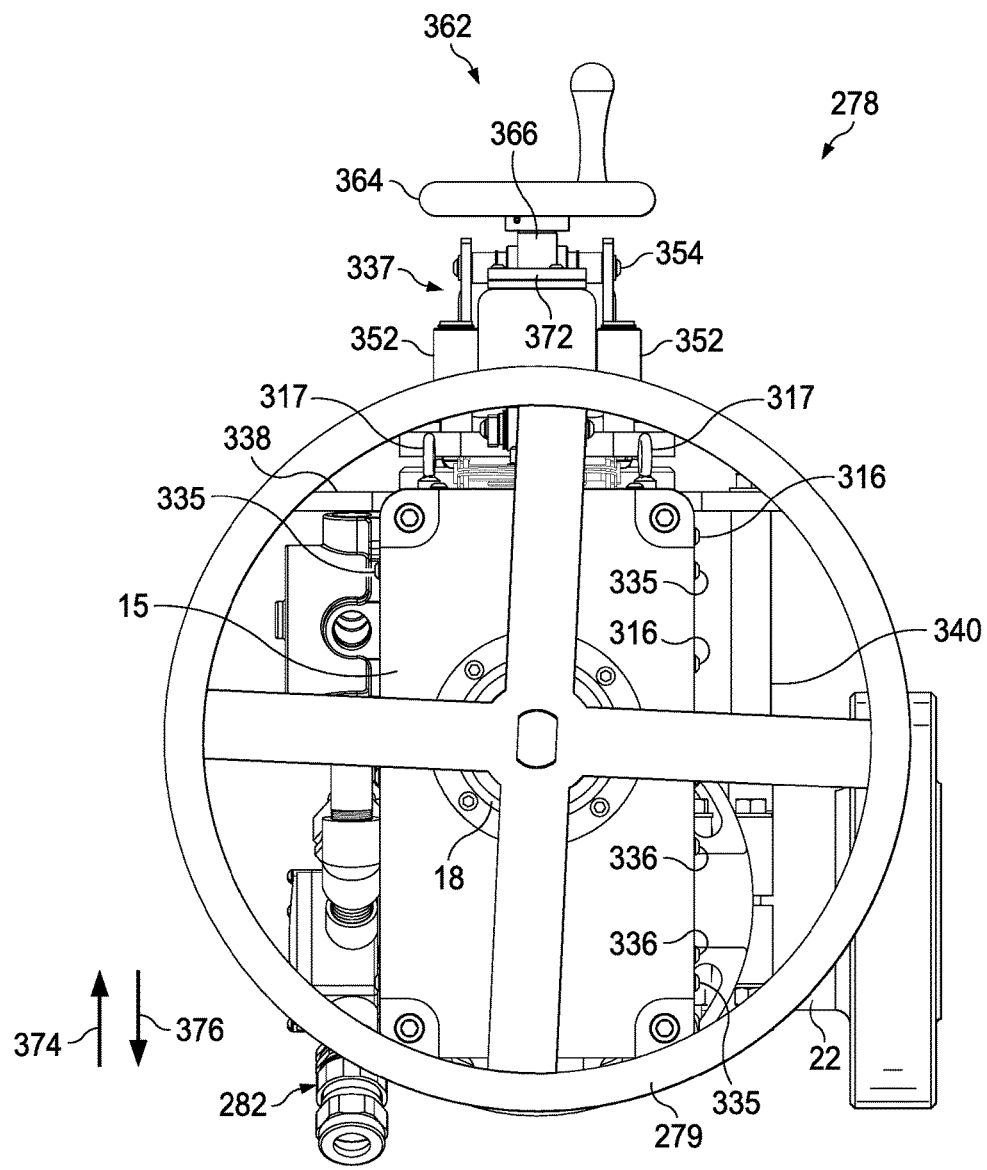
FIG. 33 is an end view of the choke apparatus of FIGS. 29-32, according to an exemplary embodiment.
Figure 34:
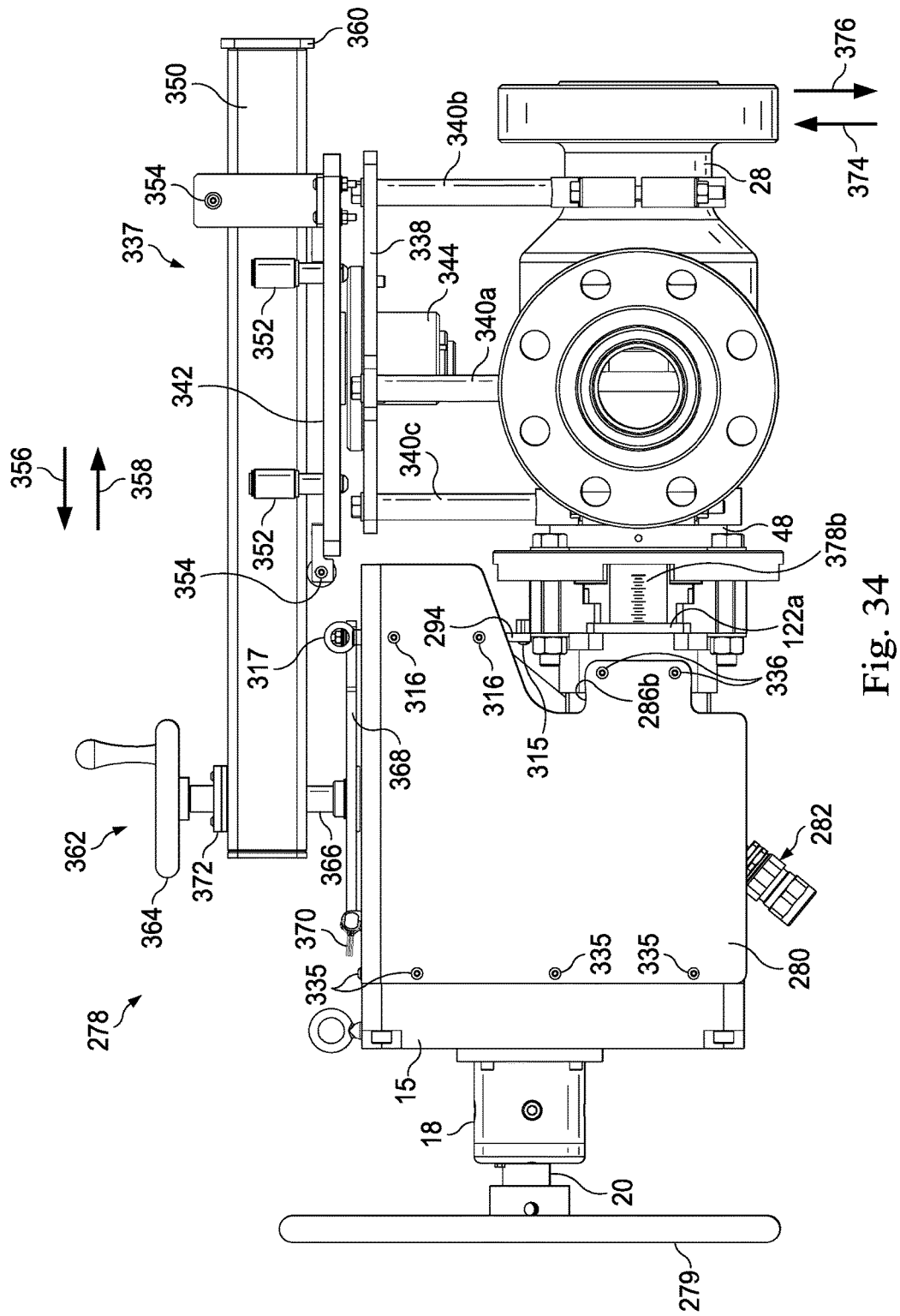
FIG. 34 is another elevational view of the choke apparatus of FIGS. 29-33, according to an exemplary embodiment.

A window 284 is formed in the case 280 proximate the motor 38 (most clearly shown in FIGS. 29 and 32). Part of the electrical conduit assembly 282 extends through the window 284 to facilitate the association of the various signal and control wires with the one or more components of the choke apparatus 278. Additionally, a pair of cut-outs 286a and 286b are formed in the case 280 on opposing sides thereof. The cut-outs 286a and 286b permit access to the bonnet plate 60 and/or the adapter 42, without removing the case 280, to facilitate the insertion of the fasteners 198a-d through the slotted openings 68a-d, respectively, of the bonnet plate 60, and further through the outer corner bores 140a-d, respectively, of an adapter 288 (discussed in further detail below).

Figure 35:
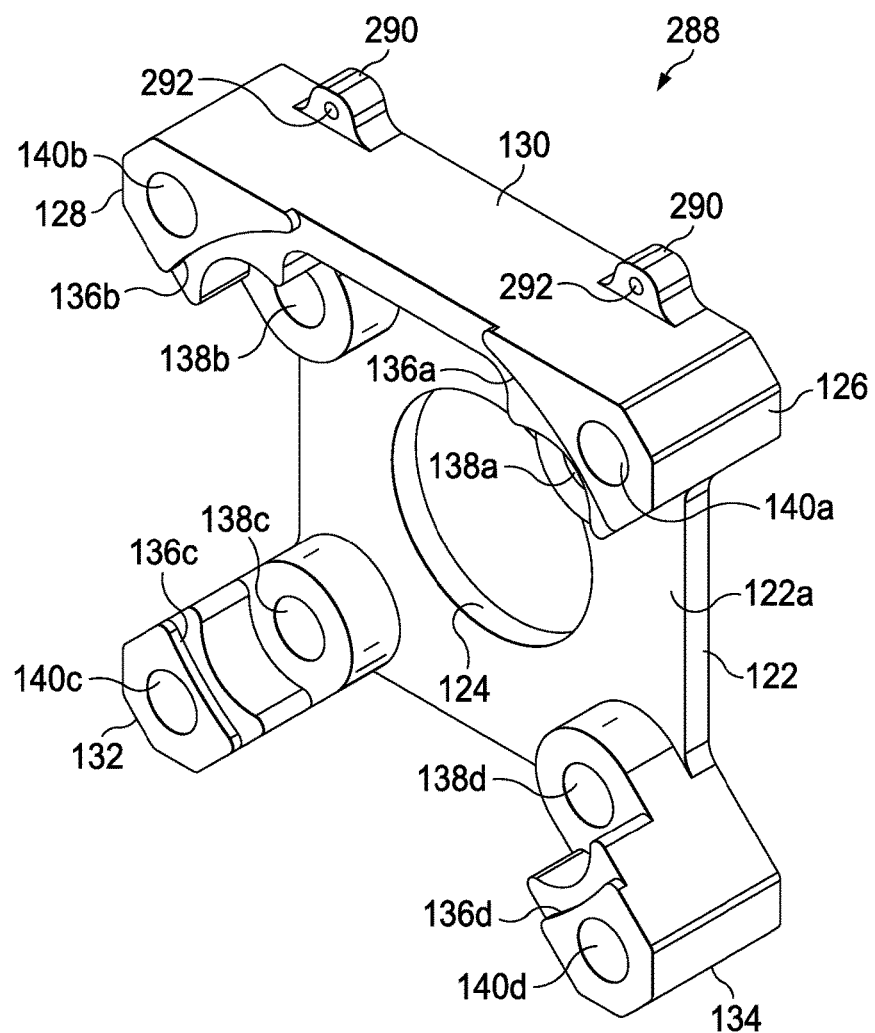
FIG. 35 is a perspective view of an adapter of the choke apparatus of FIGS. 29-34, according to an exemplary embodiment.

In several exemplary embodiments, the choke apparatus 278 includes an adapter 288, rather than the adapter 42. Referring to FIG. 35, with continuing reference to FIGS. 29-34, an exemplary embodiment of the adapter 288 is illustrated. The adapter 288 includes several features that are identical to corresponding features of the adapter 42, which identical features are given the same reference numerals. A plurality of mounting tabs 290 are connected to the horizontally-extending wall 130 and/or the corner support blocks 126 and 128 of the adapter 288. In several exemplary embodiments, the mounting tabs 290 are integrally formed with the adapter 288. Openings such as, for example, threaded-holes 292, are formed in respective ones of the mounting tabs 290.

Figure 36:
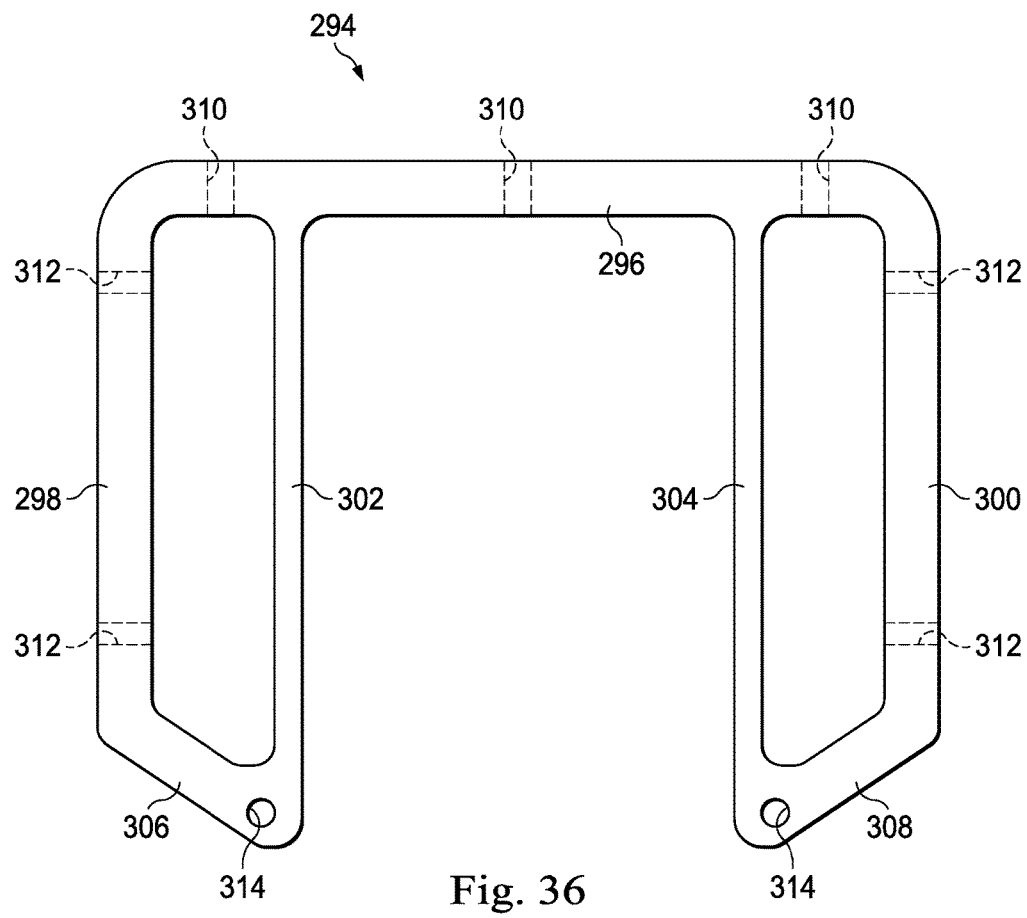
FIGS. 36 and 37 are elevational and top views, respectively, of a case support bracket of the choke apparatus of FIGS. 29-34, according to an exemplary embodiment.
Figure 37:
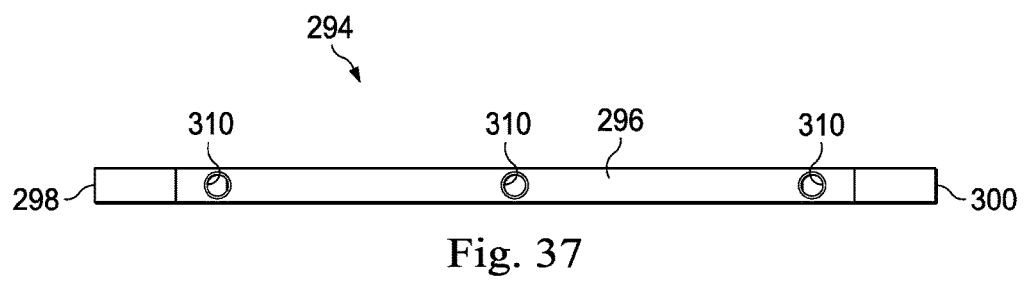

In several exemplary embodiments, the choke apparatus 278 includes a case support bracket 294, rather than the case support bracket 46. Referring to FIGS. 36 and 37, with continuing reference to FIGS. 29-35, an exemplary embodiment of the case support bracket 294 is illustrated. The case support bracket 294 includes several features that are identical to corresponding features of the case support bracket 46. The case support bracket 294 is a generally U-shaped frame including a support member 296, a pair of parallel-spaced anchor members 298 and 300 connected to the support member 296, and a pair of ribs 302 and 304 connected to the support member 296 and positioned between the anchor members 298 and 300. A pair of base members 306 and 308 are connected to respective end portions of the anchor members 298 and 300 opposing the support member 296. The base members 306 and 308 extend from the anchor members 298 and 300 toward the ribs 302 and 304, respectively, to which the base members 306 and 308 are also connected. A plurality of threaded-holes 310 are formed in the support member 296. Similarly, a plurality of threaded-holes 312 are formed in each of the anchor members 298 and 300. Openings such as, for example, through-holes 314 are formed in the case support bracket 294 at or near the respective intersections of the base members 306 and 308 with the ribs 302 and 304. In an exemplary embodiment, the support member 296, the anchor members 298 and 300, the ribs 302 and 304, and the base members 306 and 308 are integrally formed.

Referring back to FIGS. 29-34, with continuing reference to FIGS. 35-37, when the choke apparatus 278 is assembled, fasteners 315 (most clearly shown in FIGS. 32 and 34) extend through the respective through-holes 314 to threadably engage the corresponding threaded-holes 292 in the mounting tabs 290 so that the case support bracket 294 is securely attached to the adapter 288. Further, the space defined between the ribs 302 and 304 accommodates at least a portion of the motor 38 such as, for example, the mechanical brake. Further still, fasteners 316 extend through openings in the case 280 to threadably engage the threaded-holes 312 in the anchor members 298 and 300 so that the case 280 is securely attached to the case support bracket 294. Finally, lift-hooks 317 extend through openings in the case 280 to threadably engage some of the threaded-holes 310 in the support member 296, thus providing lifting point(s) for general lifting of the electric actuator 14. Other(s) of the threaded-holes 310 provide gantry lift point(s) for the connection of a gantry to the case support bracket 294.

Figure 38:
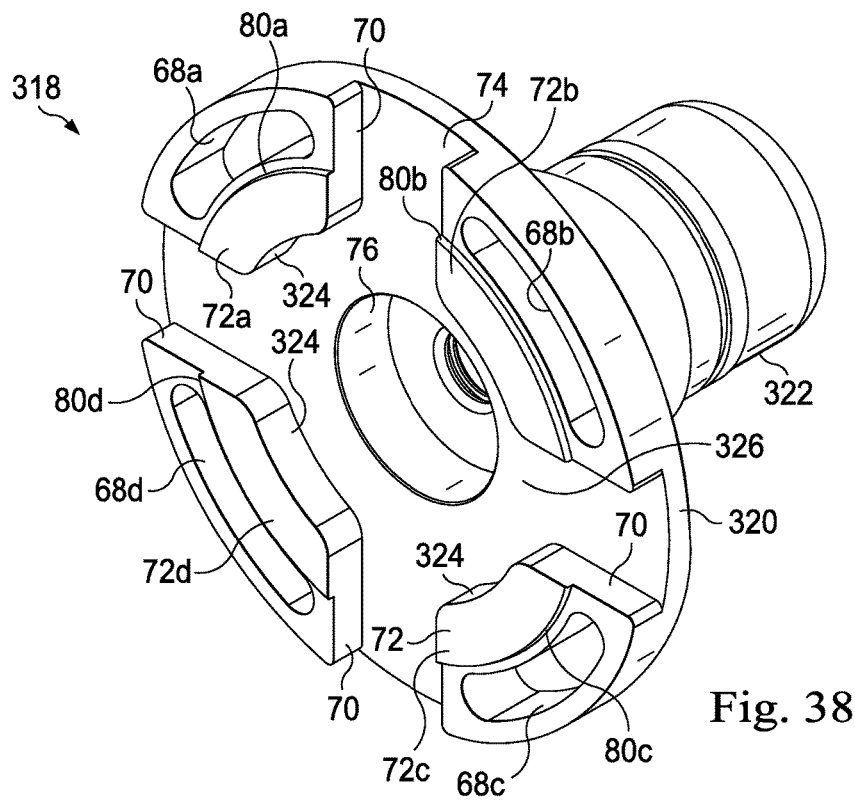
FIG. 38 is a perspective view of a bonnet assembly of the choke apparatus of FIGS. 29-34, according to an exemplary embodiment.
Figure 39:
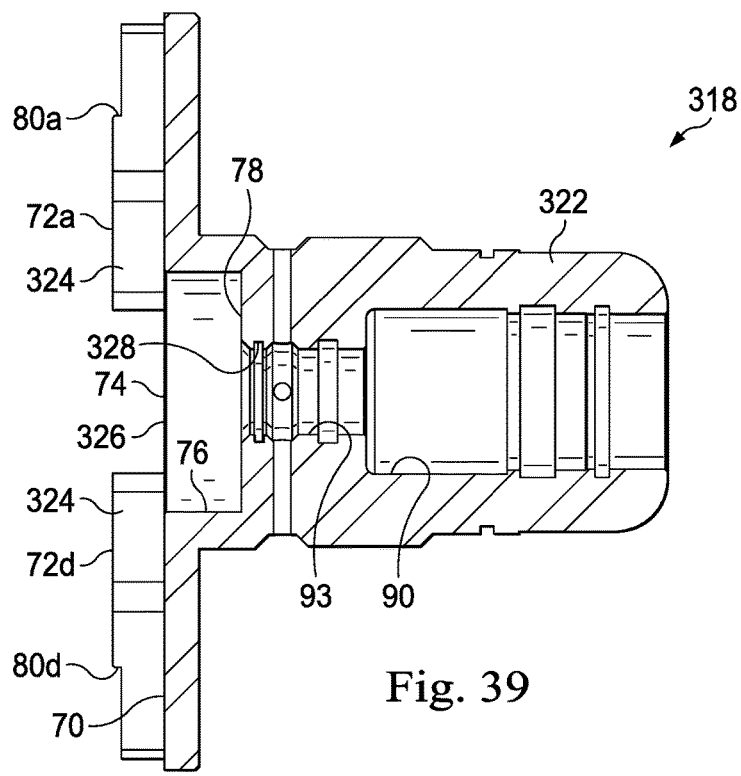
FIG. 39 is a sectional view of the bonnet assembly of FIG. 38, according to an exemplary embodiment.

In several exemplary embodiments, the choke apparatus 278 includes a bonnet assembly 318, rather than the bonnet assembly 44. Referring to FIGS. 38 and 39, with continuing reference to FIGS. 29-37, an exemplary embodiment of the bonnet assembly 318 is illustrated. The bonnet assembly 318 includes several parts that are identical to corresponding parts of the bonnet assembly 44, which identical parts are given the same reference numerals. The bonnet plate 60 and the sealing assembly 62 are omitted from the bonnet assembly 318 in favor of a bonnet plate 320 and a sealing assembly 322, respectively. The bonnet plate 320 and the sealing assembly 322 each include several features that are identical to corresponding features of the bonnet plate 60 and the sealing assembly 62, respectively, which identical features are given the same reference numerals. Moreover, the gate 64 and the choke stem 66 are omitted from view in FIGS. 38 and 39 to illustrate additional features of the bonnet plate 320 and the sealing assembly 322.

A circular recess 324 is formed in the side surface 72 of the bonnet plate 320, defining a circular surface 326 and, together with the cross-shaped recess 70, forming the non-contiguous portions 72a-d of the surface 72, as shown in FIG. 38. The circular surface 326 overlaps the cross-shaped surface 74. As a result, the circular recess 76 is formed into both the circular surface 326 and the cross-shaped surface 74 at the center of the bonnet plate 320. In an exemplary embodiment, the cross-shaped recess 70 and the circular recess 324 are together adapted to receive the handle of a tool such as, for example, a spanner wrench, to facilitate the removal of the bonnet assembly 318 from the choke body 12. Additionally, a supporting guide or scraper (not shown) is disposed in an annular groove 328 formed at the bore 93 of the sealing assembly 322, as shown in FIG. 39. The annular groove 328 is formed adjacent the circular surface 78 so that the scraper contacts the choke stem 66 (omitted from FIGS. 38 and 39). In this manner, the scraper provides a point of support so that the choke stem 66 remains substantially centered in the bore 93. Moreover, the scraper prevents, or at least reduces, the migration of debris from the circular recess 76 into the bore 93 and, thereafter, the bore 90 of the sealing assembly 322.

Figure 40:
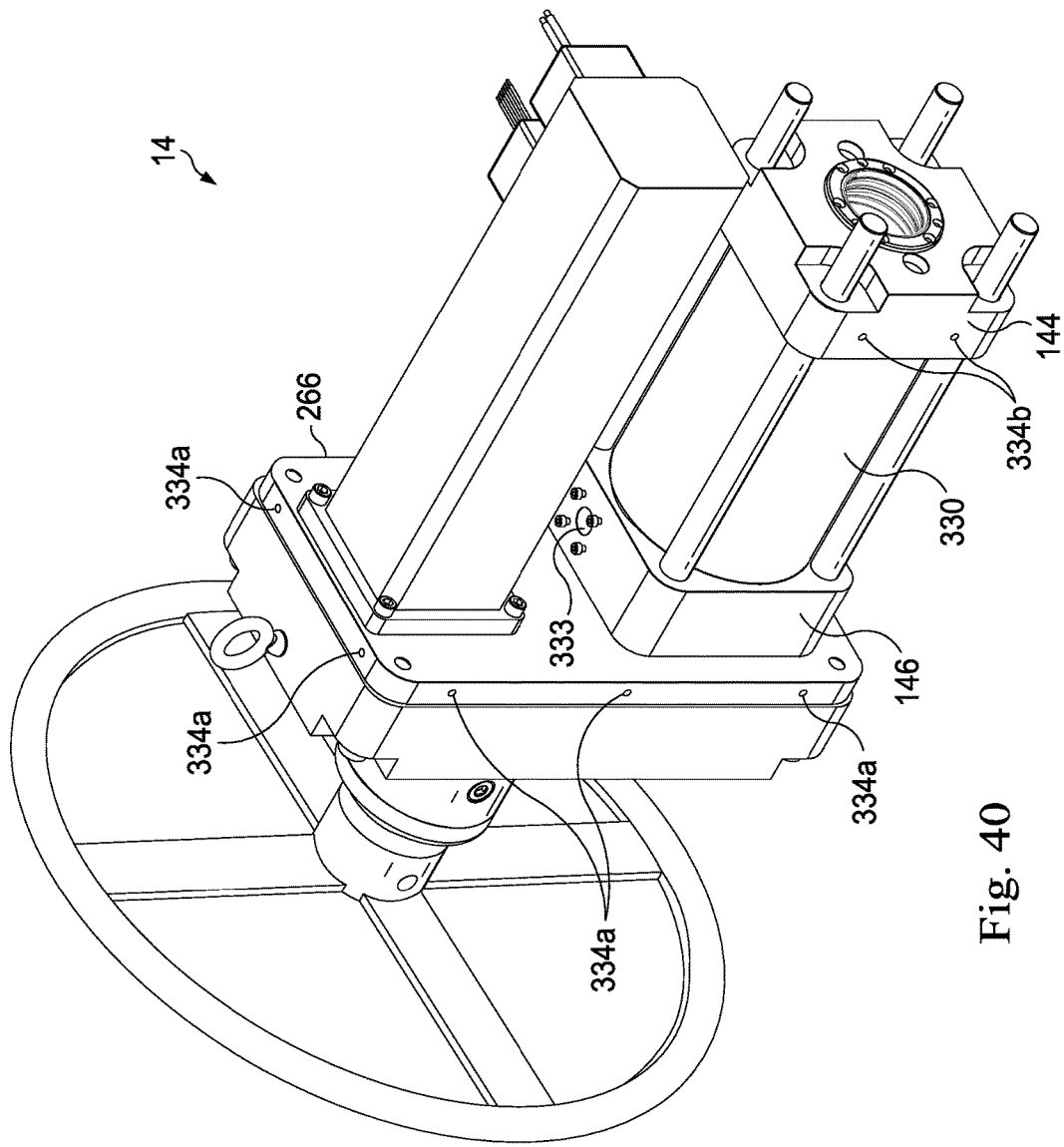
FIG. 40 is a perspective view of an electric actuator of the choke apparatus of FIGS. 29-34, according to an exemplary embodiment.
Figure 41:
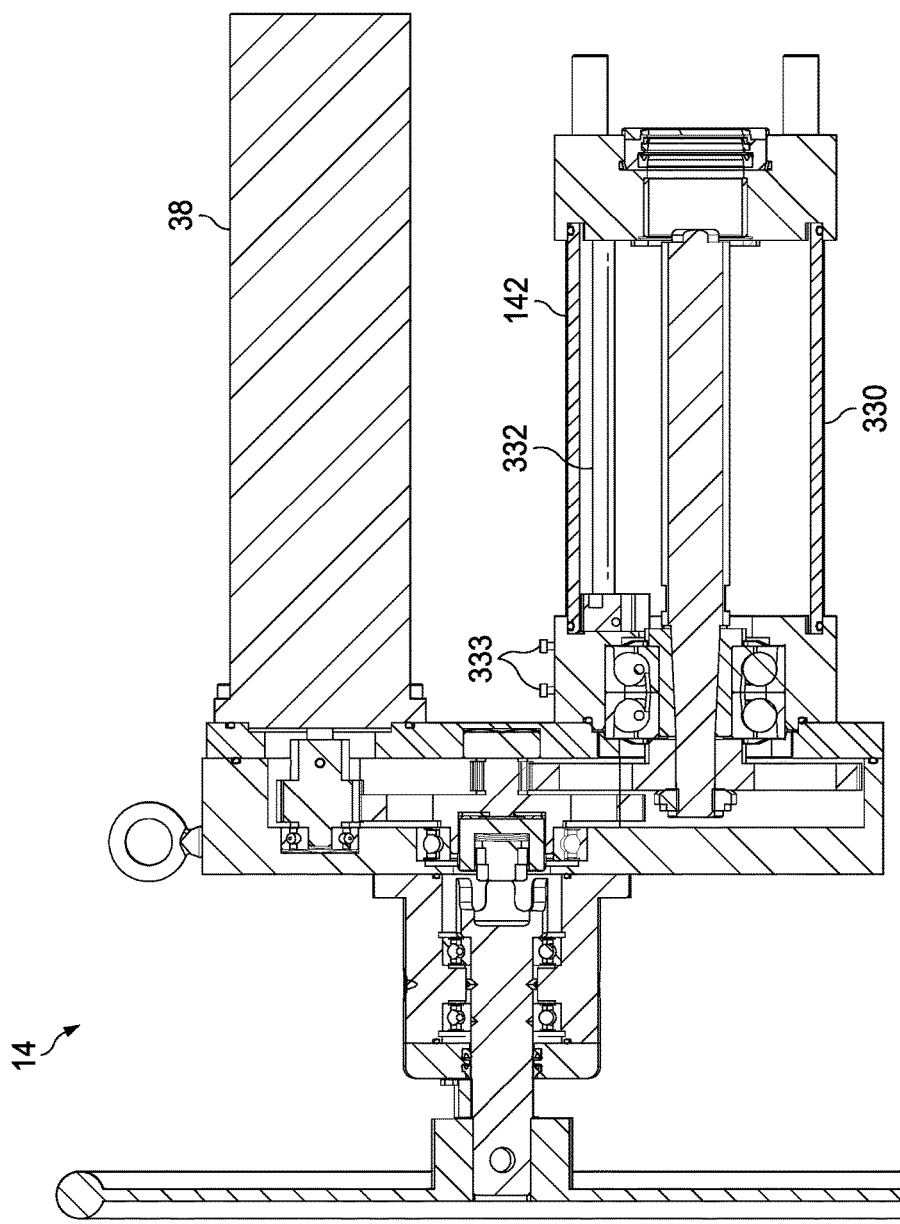
FIG. 41 is a sectional view of the electric actuator of FIG. 40, according to an exemplary embodiment.

In several exemplary embodiments, the choke apparatus 278 includes a linear roller screw assembly 330, rather than the linear roller screw assembly 40. Referring to FIGS. 40 and 41, with continuing reference to FIGS. 29-39, an exemplary embodiment of the linear roller screw assembly 330 is illustrated. The linear roller screw assembly 330 includes several parts that are identical to corresponding parts of the linear roller screw assembly 40, which identical parts are given the same reference numerals. Moreover, the nut 158, the tubular coupling 160, and the actuator stem 162 are omitted from FIGS. 40 and 41 to illustrate additional features of the linear roller screw assembly 330.

An absolute position sensor 332 is disposed in the tubular housing 142 of the linear roller screw assembly 330 and operably coupled to the nut 158 (omitted from view in FIGS. 40 and 41). The absolute position sensor 332 includes several features that are identical to corresponding features of the absolute position sensor 242. In an exemplary embodiment, the absolute position sensor 332 is in communication with the motor controller 244 (most clearly shown in FIG. 24; not visible in FIGS. 40 and 41) of the motor 38. In an exemplary embodiment, instead of, or in addition to, the motor controller 244, the absolute position sensor 332 is in communication with the one or more other controllers 246 (most clearly shown in FIG. 24; not visible in FIGS. 40 and 41). The operation of the absolute position sensor 332 is identical to the above-described operation of the absolute position sensor 242. An electrical connection point 333 is formed in the end block 146 of the roller screw assembly 330. Signal and control wires associated with the motor controller 244 and/or the other controllers 246 are connected to the electrical connection point 333 to establish electrical communication with the absolute position sensor 332.

A plurality of threaded-holes 334a are formed in the case 266 of the gearbox 15, as shown in FIG. 40. Similarly, a plurality of threaded-holes 334b are formed in the end block 144 of the roller screw assembly 330. Referring back to FIGS. 29-34, with continuing reference to FIG. 40, fasteners 335 extend through openings in the case 280 to threadably engage the threaded-holes 334a in the case 266 so that the case 280 is securely attached to the gearbox 15. Further, fasteners 336 extend through openings in the case 280 to threadably engage the threaded-holes 334b in the end block 144 so that the case 280 is securely attached to the roller screw assembly 330.

In several exemplary embodiments, at least the motor 38, the gearbox 15, the case 280, the clutch 18, the linear roller screw assembly 330, the case support bracket 294, and the adapter 288 together form the electric actuator 14, which is operably coupled to the bonnet assembly 318 and the choke body 12 to form the drilling choke 278. In several exemplary embodiments, the combination of at least the motor 38, the gearbox 15, the clutch 18, and the linear roller screw assembly 330 forms the electric actuator 14, which is operably coupled to the bonnet assembly 318 and the choke body 12; in an exemplary embodiment, the adapter 288 is part of the electric actuator 14. In several exemplary embodiments, one or more of the motor 38, the gearbox 15, the clutch 18, and the linear roller screw assembly 330 together constitute the electric actuator 14, which is operably coupled to the bonnet assembly 318 and the choke body 12; in an exemplary embodiment, the adapter 288 is part of the electric actuator 14.

Referring again to FIGS. 29-34, the choke apparatus 278 further includes a gantry 337, which is connected to the choke body 12. The gantry 337 includes a base plate 338 anchored to the choke body 12 via a trio of support arms 340a, 340b, and 340c connected to the inlet port 22, the outlet port 28, and the pipe 48, respectively, of the choke body 12. A carrier plate 342 is rotatably coupled to the base plate 338 via a rotatable connection 344. The carrier plate 342 is thus capable of rotating in an angular direction 346 or an angular direction 348, which is opposite the angular direction 346, and relative to the base plate 338 (most clearly shown in FIG. 30). A carrier beam 350 is operably coupled to the carrier plate 342 via a plurality of rollers such as, for example, alignment rollers 352 and cantilever rollers 354.

The alignment rollers 352 are connected to the carrier plate 342 and positioned to contact opposing side portions of the carrier beam 350. As a result, the alignment rollers 352 permit displacement of the carrier beam 350 in an axial direction 356 or an axial direction 358, which is opposite the axial direction 356, and relative to the carrier plate 342. In contrast, the cantilever rollers 354 are connected to the carrier plate 342 and positioned so that the cantilever roller(s) 354 that is spaced relatively farther from the electric actuator 14 contacts a top portion of the carrier beam 350 and the cantilever roller(s) 354 that is spaced relatively closer to the electric actuator 14 contacts a bottom portion of the carrier beam 350. As a result, the cantilever rollers 354 permit axial movement of the carrier beam 350 in the axial directions 356 and 358.

A flange 360 is formed at an end portion of the carrier beam 350 to limit axial movement of the carrier beam 350, relative to the carrier plate 342, in the axial direction 356. In contrast, an end portion of the carrier beam 350 opposing the flange 360 is operably coupled to the electric actuator 14 via a lift assembly 362. The lift assembly 362 includes an actuator such as, for example, a handwheel 364, an adjustable lift-shaft 366 operably coupled to the handwheel 364, and a lift-plate 368 connected to the electric actuator 14 and rotatably coupled to the lift-shaft 366. The lift-plate 368 is connected to the electric actuator 14 via one or more of the threaded-holes 310, which provide gantry lift point(s) for connection of the gantry 337 to the case support bracket 294. In an exemplary embodiment, the lift-plate 368 is also connected to the electric actuator 14 via pins 370 connected to one or more gantry lift point(s) formed in, or connected to, the case 280. The handwheel 364 is operable to raise and lower the height of the lift-shaft 366 and thus the lift plate 368 and the electric actuator 14. More particularly, in an exemplary embodiment, the handwheel 364 is operable to rotate the lift shaft 366 so that external threads of the lift shaft 366 threadably engage internal threads of a bushing 372 connected to the carrier beam 350. In this manner, the handwheel 364 can be rotated to advance the lift shaft 366, the lift-plate 368, and the electric actuator 14 in either a vertical direction 374 or a vertical direction 376, which is opposite the vertical direction 374.

In operation, the gantry 337 permits the electric actuator 14 to swing out of the way of the choke body 12 so that maintenance on the choke body 12 can take place without interference from the electric actuator 14, and without the need for a forklift or other lifting apparatus or system. Specifically, once the electric actuator 14 has been disconnected from the bonnet assembly 318, the carrier beam 350 is displaced in the axial direction 356, via the alignment rollers 352 and the cantilever rollers 354, thus moving the electric actuator 14 away from the choke body 12. As the electric actuator 14 is moved away from the choke body 12, the cantilever rollers 354 contact the top and bottom portions of the carrier beam 350 to carry the weight of the electric actuator 14. Once the electric actuator 14 has been sufficiently moved away from the choke body 12, the carrier plate 342 is rotated in one of the angular directions 346 or 348, and relative to the base plate 338, to swing the electric actuator 14 out of the way of the choke body 12.

After the necessary maintenance on the choke body 12 has taken place, the carrier plate 342 is rotated in the other of the angular directions 346 or 348, and relative to the base plate 338, thus swinging the electric actuator 14 back in line with the choke body 12. The carrier beam 350 is then displaced in the axial direction 358, via the alignment rollers 352 and the cantilever rollers 354, thus moving the electric actuator 14 towards the choke body 12. The gantry 337 permits relative movement between the choke body 12 and the electric actuator 14, in the vertical direction 374 and/or the vertical direction 376, to facilitate alignment of the electric actuator 14 with the choke body 12. Specifically, the gantry 337 permits height adjustment of the choke body 12, relative to the ground or other horizontal surface, via the lift assembly 362. This height adjustment facilitates the toolless operable coupling between the actuator stem 162 and the choke stem 66, which operably couples the linear roller screw assembly 330 to the bonnet assembly 318. The toolless operable coupling between the actuator stem 162 and the choke stem 66 of the choke apparatus 278 is identical to the toolless operable coupling illustrated in FIGS. 5, 6, and 16.

In several exemplary embodiments, the choke apparatus 278 includes a pair of measurement scales 378a and 378b, rather than the measurement scale 250 and/or the measurement scale 252. The measurement scales 378a and 378b are located on opposing sides of the electric actuator 14. Referring again to FIGS. 29-34, with particular reference to FIGS. 32 and 34, an exemplary embodiment of the measurement scales 378a and 378b is illustrated. The measurement scales 378a and 378b are connected to, or formed in, at least one of the choke stem 66, the tubular coupling 160, and the actuator stem 162, and extend out of the case 280.

In operation, in an exemplary embodiment, the measurement scales 378a and 378b move along with the choke stem 66, the tubular coupling 160, and/or the actuator stem 162 during the above-described operation of the choke apparatus 278. Before, during, and after this movement of the measurement scales 378a and 378b, the position of the measurement scales 378a and 378b (and thus each of the choke stem 66, the tubular coupling 160, and/or actuator stem 162), relative to surface 122a of the plate 122 of the adapter 288, indicates the position of the gate 64, relative to the seat 58. The position of the measurement scales 378a and 378b, relative to the surface 122a of the plate 122 of the adapter 288, indicates the position of the gate 64, relative to the seat 58, regardless of whether electrical power is being supplied to the choke apparatus 278. Thus, in several exemplary embodiments, the position of the measurement scales 378a and 378b relative to the surface 122a of the plate 122 provides a physical indicator that shows the choke position of the choke apparatus 278, regardless of whether the choke apparatus 278 has electrical power. As a result, a visual inspection of the choke apparatus 278 indicates the actual choke position, that is, the degree to which the choke apparatus 278 is open or closed (the position of the gate 64 relative to the seat 58).

In several exemplary embodiments, a pair of cut-outs or windows are formed in the case 280 to facilitate visual inspection of the position of the measurement scales 378a and 378b relative to the surface 122a of the plate 122. In several exemplary embodiments, the case 280 does not vertically extend over the actuator stem 162 and at least a portion of the plate 122 to thereby facilitate visual inspection of the position of the measurement scales 378a and 378b relative to the surface 122a of the plate 122. In an exemplary embodiment, the measurement scales 378a and 378b each include a "fully closed" marking; when these "fully closed" markings are aligned, or nearly aligned, with the surface 122a, the gate 64 contacts the seat 58 so that the choke apparatus 278 is closed and fluid is prevented from flowing therethrough. In an exemplary embodiment, the measurement scales 378a and 378b each include a "fully opened" marking; when these "fully opened" markings are aligned, or nearly aligned, with the surface 122a, the gate 64 is spaced from the seat 58 so that the choke apparatus 278 is fully open and fluid is permitted to flow therethrough. In an exemplary embodiment, the measurement scales 378a and 378b each include a plurality of markings disposed between a "fully closed" and a "fully opened" marking; when any one of the markings in this plurality of markings is aligned, or nearly aligned, with the surface 122a, the gate 64 is positioned relative to the seat 58 so that the choke apparatus 278 is partially open/closed and fluid is permitted to flow therethrough.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A choke apparatus, comprising:
   a choke body through which fluid is adapted to flow, the choke body defining a longitudinal axis;
   a bonnet assembly connected to the choke body, the bonnet assembly comprising a choke stem; and
   an electric actuator operably coupled to the bonnet assembly, the electric actuator comprising an actuator stem toolessly operably coupled to the choke stem of the bonnet assembly; and
   an adapter connected to the electric actuator;
   wherein the actuator stem and the choke stem are generally coaxial along the longitudinal axis of the choke body; and
   wherein the actuator stem and the choke stem are movable, relative to the choke body, to control imposition of backpressure on the fluid when the fluid flows through the choke body
   wherein the bonnet assembly comprises:
      a bonnet plate through which the choke stem extends, and to which the adapter is connected;
      a nose protruding from the bonnet plate and connected to the choke body to connect the bonnet assembly to the choke body, the nose defining a distal end surface;
      a bore formed in the distal end surface of the of the nose; and
      a gate extending within the bore and to which the choke stem is connected;
   wherein the choke body comprises an internal threaded connection;
   wherein the nose comprises an external threaded connection threadably engaged with the internal threaded connection of the choke body to connect the bonnet assembly to the choke body;
   wherein the bonnet assembly further comprises a plurality of slotted openings formed through the bonnet plate;
   wherein the slotted openings are circumferentially spaced and each of the slotted openings is curved;
   wherein the choke apparatus further comprises fasteners extending through the slotted openings, respectively, to connect the bonnet assembly to the adapter; and
   wherein the slotted openings allow the adapter and the electric actuator to rotate, relative to the bonnet assembly, to reduce risk of disengagement, at least in part, of the external threaded connection of the nose from the internal threaded connection of the choke body.

2. The choke apparatus of claim 1, wherein the choke stem comprises a cap; and
   wherein the actuator stem comprises a first opening that receives the cap to toolessly operably couple the actuator stem to the choke stem.

3. The choke apparatus of claim 2, wherein the actuator stem further comprises:
   a second opening intersecting the first opening, the second opening defining an inside surface; and
   a cavity formed in the inside surface, the cavity defining a first axially-facing surface;
   wherein a second axially-facing surface, which is spaced in a parallel relation from the first axially-facing surface, is at least partially defined by the cavity; and
   wherein at least a portion of the cap is disposed within the cavity so that the portion of the cap is disposed between the first and second axially-facing inside surfaces to toolessly operably couple the actuator stem to the choke stem.

4. The choke apparatus of claim 3, wherein the first opening of the actuator stem is not generally coaxial with the longitudinal axis of the choke body; and
   wherein the second opening of the actuator stem is generally coaxial with the longitudinal axis of the choke body.

5. The choke apparatus of claim 1, wherein the choke body comprises a seat; and
   wherein the electric actuator is adapted to cause the actuator stem to move so that the choke stem and the gate connected thereto move, relative to the seat, to control the imposition of backpressure on the fluid when the fluid flows through the choke body.

6. The choke apparatus of claim 1, wherein the adapter comprises an opening through which the actuator stem extends.

7. The choke apparatus of claim 1, wherein the connection between the adapter and the bonnet assembly permits the electric actuator to move, relative to each of the bonnet assembly and the choke body.

8. A choke apparatus, comprising:
   a choke body through which fluid is adapted to flow, the choke body defining a longitudinal axis;
   a bonnet assembly connected to the choke body, the bonnet assembly comprising a choke stem; and
   an electric actuator operably coupled to the bonnet assembly, the electric actuator comprising an actuator stem toolessly operably coupled to the choke stem of the bonnet assembly; and
   an adapter connected to the electric actuator;

wherein the actuator stem and the choke stem are generally coaxial along the longitudinal axis of the choke body; and wherein the actuator stem and the choke stem are movable, relative to the choke body, to control imposition of backpressure on the fluid when the fluid flows through the choke body wherein the bonnet assembly comprises:
- a bonnet plate through which the choke stem extends, and to which the adapter is connected;
- a nose protruding from the bonnet plate and connected to the choke body to connect the bonnet assembly to the choke body, the nose defining a distal end surface;
- a bore formed in the distal end surface of the of the nose; and
- a gate extending within the bore and to which the choke stem is connected;

wherein the bonnet assembly further comprises a plurality of circumferentially-spaced, curved external alignment shoulders formed in the bonnet plate;

wherein the adapter comprises a plurality of circumferentially-spaced, curved internal alignment shoulders formed therein; and wherein the external alignment shoulders mate against the internal alignment shoulders, respectively, to align the bonnet plate with the adapter.

9. The choke apparatus of claim 8, wherein the choke stem comprises a cap; and wherein the actuator stem comprises a first opening that receives the cap to toollessly operably couple the actuator stem to the choke stem.

10. The choke apparatus of claim 9, wherein the actuator stem further comprises:

a second opening intersecting the first opening, the second opening defining an inside surface; and a cavity formed in the inside surface, the cavity defining a first axially-facing surface;

wherein a second axially-facing surface, which is spaced in a parallel relation from the first axially-facing surface, is at least partially defined by the cavity; and wherein at least a portion of the cap is disposed within the cavity so that the portion of the cap is disposed between the first and second axially-facing inside surfaces to toollessly operably couple the actuator stem to the choke stem.

11. The choke apparatus of claim 10, wherein the first opening of the actuator stem is not generally coaxial with the longitudinal axis of the choke body; and wherein the second opening of the actuator stem is generally coaxial with the longitudinal axis of the choke body.

12. The choke apparatus of claim 8, wherein the choke body comprises a seat; and wherein the electric actuator is adapted to cause the actuator stem to move so that the choke stem and the gate connected thereto move, relative to the seat, to control the imposition of backpressure on the fluid when the fluid flows through the choke body.

13. The choke apparatus of claim 8, wherein the adapter comprises an opening through which the actuator stem extends.

14. The choke apparatus of claim 8, wherein the connection between the adapter and the bonnet assembly permits the electric actuator to move, relative to each of the bonnet assembly and the choke body.

* * * * *